US012502012B2

(12) United States Patent
Farinola et al.

(10) Patent No.: US 12,502,012 B2
(45) Date of Patent: Dec. 23, 2025

(54) SELF-CLOSING SECURITY DOOR ASSEMBLY FOR RETAIL DISPLAY

(71) Applicant: VIRA Insight, LLC, Lewisville, TX (US)

(72) Inventors: Nick Farinola, Kinnelon, NJ (US); James W. Waalkes, Grand Rapids, MI (US); Benjamin J. Sahlberg, Grand Rapids, MI (US); Peter H. Rozes, Trophy Club, TX (US)

(73) Assignee: VIRA Insight, LLC, Lewisville, TX (US)

( * ) Notice: Subject to any disclaimer, the term of this patent is extended or adjusted under 35 U.S.C. 154(b) by 0 days.

(21) Appl. No.: 19/055,178

(22) Filed: Feb. 17, 2025

(65) Prior Publication Data

US 2025/0185824 A1 Jun. 12, 2025

Related U.S. Application Data

(63) Continuation-in-part of application No. 18/141,602, filed on May 1, 2023.

(51) Int. Cl.

*A47F 3/00* (2006.01)
*A47F 5/00* (2006.01)
*E05D 15/06* (2006.01)
*E05F 1/16* (2006.01)

(52) U.S. Cl.

CPC ............ *A47F 3/002* (2013.01); *A47F 5/0043* (2013.01); *E05D 15/0656* (2013.01); *E05F 1/16* (2013.01); *E05Y 2201/484* (2013.01); *E05Y 2201/654* (2013.01); *E05Y 2201/668* (2013.01); *E05Y 2900/202* (2013.01)

(58) Field of Classification Search

CPC .......... A47F 3/002; A47F 5/0043; E05F 1/16; E05D 15/0656
USPC .......................................... 312/138.1, 319.1
See application file for complete search history.

(56) References Cited

U.S. PATENT DOCUMENTS 2,877,511 A * 3/1959 Viola, Jr. .............. E06B 3/4681 49/413
2,992,450 A * 7/1961 Pittenger ................... E05F 1/16 160/192
3,584,417 A * 6/1971 Gatton ................ E05D 15/0686 49/404
3,837,119 A * 9/1974 Conneally ............ F25D 23/021 49/404

(Continued)

*Primary Examiner* — Daniel J Troy
*Assistant Examiner* — Timothy M Ayres
(74) *Attorney, Agent, or Firm* — Warner Norcross + Judd LLP

(57) ABSTRACT

A self-closing door assembly for limiting access to goods displayed on a shelving system. A frame assembly is attached to the shelving system adjacent the front edge of a first shelf, with upper and lower guide rails to slidably engage a pair of overlapping and self-closing doors. The doors are aligned to laterally slide open from a closed position at which they interfere with manual access to the goods displayed on the shelf. Biasing members disposed between the frame assembly and the doors urge the doors toward the closed position. The doors are adapted for manual engagement to be urged toward the open position, and the biasing members automatically return the doors to the closed position upon manual release thereof.

20 Claims, 23 Drawing Sheets

(56) References Cited

U.S. PATENT DOCUMENTS

| | | | | | |
|---|---|---|---|---|---|
| 3,848,426 | A * | 11/1974 | Whitney | A47F 3/0408 62/255 |
| 4,012,008 | A * | 3/1977 | Hosooka | E05D 13/1276 242/376 |
| 4,148,535 | A * | 4/1979 | Fenwick | A47B 47/04 312/265.5 |
| 4,757,642 | A * | 7/1988 | Hahn | E05F 1/16 49/404 |
| 5,513,469 | A * | 5/1996 | Tajudeen | E05F 1/16 49/404 |
| 5,884,361 | A * | 3/1999 | Richardson | E05F 1/16 16/102 |
| 6,041,551 | A * | 3/2000 | Aspenwall | E05D 15/0686 49/425 |
| 7,686,405 | B2 * | 3/2010 | Trulaske, Sr. | E05F 1/025 49/404 |
| 8,595,898 | B2 * | 12/2013 | Smith | E05F 1/16 16/61 |
| 9,234,376 | B2 * | 1/2016 | Trulaske, Sr. | E05D 15/0652 |
| 9,706,857 | B2 * | 7/2017 | Hardy | G06Q 10/087 |
| 10,597,922 | B2 * | 3/2020 | Chang | E05D 15/063 |
| 10,724,285 | B2 * | 7/2020 | Dodge | E05F 5/003 |
| 10,736,438 | B1 * | 8/2020 | Jhaveri | A47B 47/00 |
| 11,147,394 | B2 * | 10/2021 | Vogler | A47F 5/103 |
| 11,357,341 | B2 * | 6/2022 | Ewing | A47F 3/002 |
| 2007/0007865 | A1 * | 1/2007 | Kang | A47F 3/005 312/114 |
| 2007/0101540 | A1 * | 5/2007 | Martin | A47K 3/34 16/97 |
| 2007/0236111 | A1 * | 10/2007 | Gray | A47B 96/02 312/138.1 |
| 2008/0246375 | A1 * | 10/2008 | Berg | A47B 47/0066 312/265.5 |
| 2012/0285911 | A1 * | 11/2012 | Valiulis | A47F 5/0861 49/404 |
| 2023/0332451 | A1 * | 10/2023 | Eskilsson | E05F 5/003 |

* cited by examiner

SECTION A-A

SECTION B-B

SECTION C-C

SELF-CLOSING SECURITY DOOR ASSEMBLY FOR RETAIL DISPLAY

BACKGROUND OF THE INVENTION

The present disclosure generally relates to retail merchandise display fixtures. More particularly, the present disclosure relates to self-closing security door assemblies for real shelving fixtures, which interfere with attempts at product-sweeping theft.

Shelving display fixtures for consumer products in retail are important for attractive product display, efficient utilization of limited shelf space, convenience for consumers, and for generally incentivizing purchases by consumers. However, in recent years with increasing petty larceny, particularly regarding theft by sweeping large quantities of products from retail shelves, and then quickly absconding with such products before defensive actions can be taken, retailers have a need for shelving systems that both effectively present goods for purchase while controlling mass theft by sweeping.

Some solutions to the foregoing problems in the art are to position goods out of reach of thieves, such as behind a counter, requiring retail sale personnel to retrieve the goods, for example. Another solution is to place the goods in locked cabinets, where a consumer must request assistance of retail sales personnel to open a lock for access. There are also systems that dispense goods one unit at a time, using a complex mechanical or electrical arrangement to slow the access to plural units of any given good, and which must be adapted for the size and shape of the goods to be dispensed. These solutions fall into two challenging areas, either requiring additional services of the retailer, or requiring a complex dispensing apparatus tailored to the particular goods to be dispensed. Thus, it can be appreciated that there is a need in the art for an apparatus that allows consumers to access retail goods on display without the assistance of retail service personnel, and which are flexible to present a wide range of goods while still acting as a foil to shelf-sweeping larceny.

SUMMARY OF THE INVENTION

The present disclosure provides a self-closing door assembly for limiting access to goods displayed on a shelving system.

In one embodiment, the shelving system can include a first shelf or a first panel having a front edge. The assembly can include a frame assembly that is attached to the shelving system adjacent the front edge, and a guide rail assembly that is positioned in fixed relationship to the frame assembly and aligned in parallel with the front edge.

In another embodiment, a first door can be aligned to laterally engage the guide rail assembly so as to slide between a closed position that interferes with manual access to the goods displayed on the first shelf and an open position that enables manual access to a first fractional portion of the goods displayed on the first shelf, and a first biasing member disposed between the frame assembly and the first door to urge the first door toward the closed position.

In still another embodiment, the first door can be adapted for manual engagement to be urged toward the open position. The first biasing member can return the first door to the closed position upon manual release thereof.

In another embodiment, the first biasing member can be a coiled-strip constant-force spring retained in position by the frame assembly, and with an end clip extended to engage the first door.

In yet another embodiment, the guide rail assembly can include a lower guide rail that slidably engages a lower portion of the first door, and an upper guide rail that slidably engages an upper portion of the first door.

In even another embodiment, the assembly can include first and second end panels attached to left and right sides of the frame assembly, respectively, each extending rearwardly to limit access to goods upon the first shelf from left and right sides thereof.

In a further embodiment, the assembly can include a second door aligned to laterally engage the guide rail assembly to slide between a closed position that interferes with manual access to the goods displayed on the first shelf and an open position that enables manual access to a second fractional portion of the goods displayed on the first shelf and a second biasing member disposed between the frame assembly and the second door to urge the second door toward the closed position.

In still a further embodiment, the second door can be configured for manual engagement to be urged toward the open position. The second biasing member can return the second door to the closed position upon manual release thereof.

In yet a further embodiment, the first door can overlap with the second door when urged open, and the second door can overlap with the first door when urged open.

In even a further embodiment, the first door and the second door can be arranged in left-right opposing orientation, and the guide rail assembly includes a first guide rail engaged with the first door, and a second guide rail engaged with the second door.

In another embodiment, the first door can include a first lower door portion and a first upper door portion attached to one another in height adjustable fashion to enable adjustment of the first door height according to the shelving system shelf spacing, and, the second door can include a second lower door portion and a second upper door portion attached to one another in height adjustable fashion to enable adjustment of the second door height according to the shelving system shelf spacing.

In still another embodiment, the frame assembly can include a first telescopic side frame that is height adjustable to accommodate a selected height of the first lower door portion attached to the first upper door portion, and a second telescopic side frame that is height adjustable to accommodate a selected height of the second lower door portion attached to the second upper door portion.

In yet another embodiment, the guide rail assembly can include a lower guide rail that slidably engages the first lower door portion and the second lower door portion, and an upper guide rail that slidably engages the first upper door portion and the second upper door portion.

In even another embodiment, a lower fastener can be fixed to the lower guide rail for connecting the lower guide rail to the first shelf.

In a further embodiment, the shelving system can include a second shelf located above the first shelf. An upper fastener can be fixed to the upper guide rail for connecting the upper guide rail to the first shelf, and the upper and lower door portion and the first and second telescopic side frames can be adjusted to accommodate the spacing between the first shelf and the second shelf.

In another embodiment, the self closing door assembly can include a guide rail assembly and a first door suspended along the guide rail assembly and moveable between a first closed position that interferes with manual access to the goods disposed on the first shelf and a first open position that enables manual access to the goods disposed on the first shelf; and a first biasing member disposed between the frame assembly and the first door to urge the first door in a horizontal direction toward the first closed position, the first door configured for manual engagement to be urged toward the first open position, the first biasing member arranged to return the first door to the first closed position upon manual release thereof.

In still another embodiment, the self closing door assembly can include a door that is joined with a roller. The roller can be movably disposed on a support flange, such that the roller rotates on the support flange as the door transitions to the open mode.

In yet another embodiment, the self closing door assembly can include a lower guide rail that slidably engages a lower portion of the first door, but does not support the first door. The door can be joined with the roller that is in rolling engagement with the guide rail such that a portion or all of the weight of the door is born by the guide rail as the door is suspended along the guide rail.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

The present disclosure presents illustrative embodiments of self-closing door assemblies useful in retail shelving systems of various types. A typical retail shelf has a width, depth, and height, and displays plural units of retail goods. Such shelving systems typically have a vertical structure, such as in a gondola shelving frame known to those skilled in the art, with plural shelves that are adjustable in height, enabling the retailer to adjust vertical shelf spacing to accommodate the goods to be displayed. Traditionally, these shelves enable wide open access to the goods displayed thereon. In a proper transaction, the consumer selects one or more items to purchase, leaving the remaining goods on the shelf. However, given the recent trends to mass larceny, there are individuals that wrongly take advantage of the open access by gathering a mass quantity of goods, perhaps all of the goods, and pushing them into some sort of container, then fleeing the scene and stealing the goods. In the industry, this is called "sweeping" and represents a substantial risk of loss to the retailers. As noted hereinbefore, there are known techniques for preventing this, but these require either more extensive access control by retail personnel, or the use of complex and expensive display fixtures that meter out the goods under some mechanical or automated access control scheme.

The illustrative embodiments taught herein place a barrier in front of the goods, in the form of one or more sliding doors, which require the user to slide the door open with one hand, and retrieve the desired goods with the other hand. A prompt self-closing feature of the illustrative embodiment door prevents two-handed access to the goods. The present disclosures also teaches the use of two or more sliding doors on a single shelf unit, which limits open access to half, or less than half, of the goods by opening a single door. The doors may be arranged so that they overlap one another when one is opened, making it impossible to access all the goods in an attempt to sweep them from the shelf. The self-closing door of the present disclosure is typically placed along the front edge of the shelf, with the goods located behind. In the case where the shelving system also provides access from the sides of any given shelf, the present disclosure contemplates the use of end panels that prevent access to the goods from the left and right sides of the shelf. In the case where the shelving system provides for vertical shelf spacing adjustment, the height of the self-closing door in the illustrative embodiment may be adjustable to accommodate the actual shelf spacing.

Figure 1:
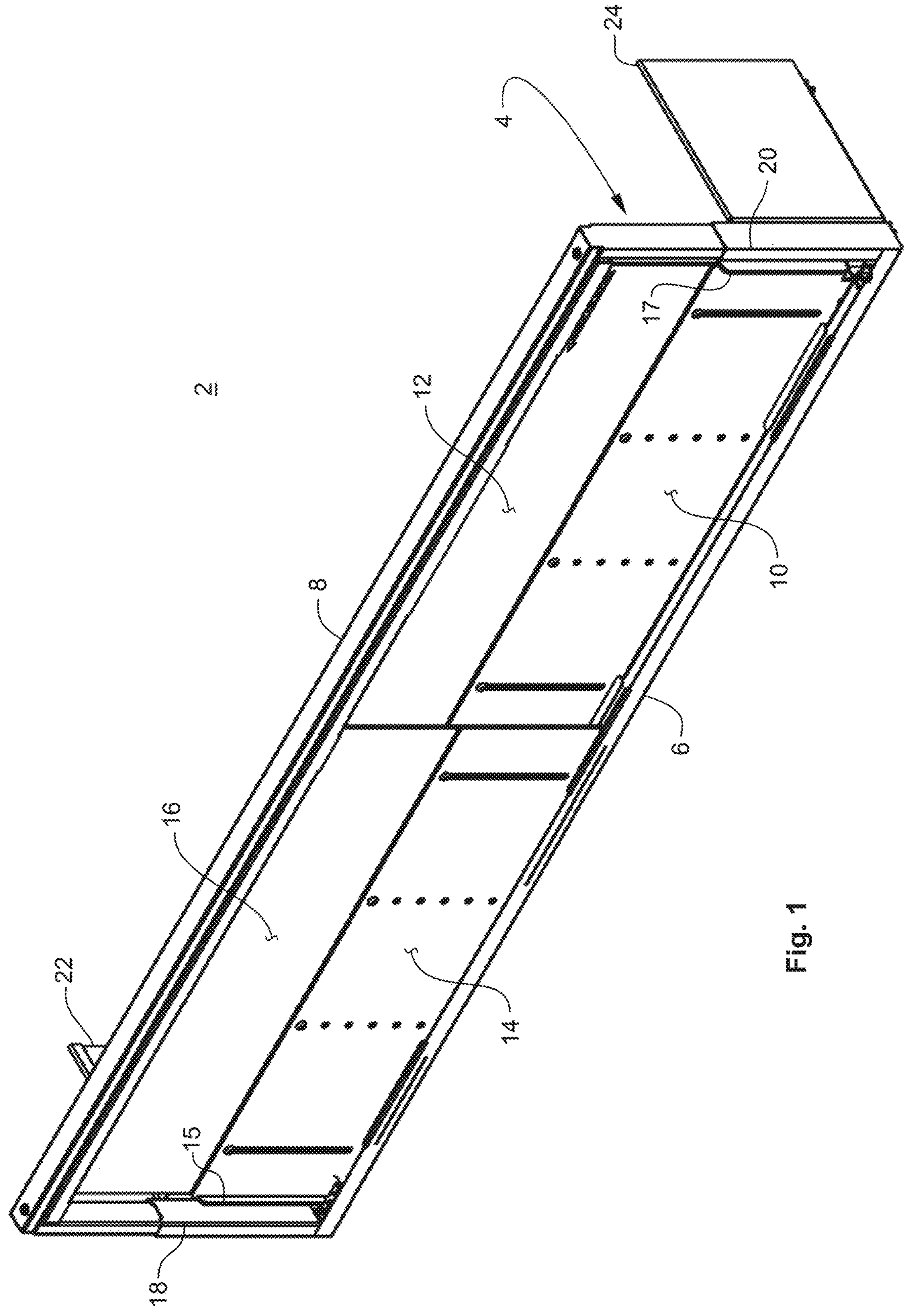
FIG. 1 is a front perspective view of a self-closing door assembly according to a current embodiment.

Reference is directed to FIG. 1, which is a front perspective view drawing of a self-closing door assembly 2, according to an illustrative embodiment of the present invention. A frame assembly 4 is comprised of several elements, including a lower guide rail 6, an upper guide rail 8, and a pair of left and right side frames 18, 20. Within the frame assembly 4, and between the upper guide rail 8 and the lower guide rail 6 are a pair of door assemblies 10, 12 on the right side and 14, 16 on the left side, which are laterally slidable along the upper guide rail 8 and the lower guide rail 6. In the illustrative embodiment, each door assembly is comprised of a lower door portion 10, 14 and an upper door portion 12, 16 that enable vertical height adjustment of each door. In this FIG. 1, the doors, 10, 12 and 14, 16, are adjusted to their maximum height, as illustrated. Left and right side panels 22, 24 extend rearwardly from the frame assembly 4 to control access from the left and right sides, respectively. Also note in this view that the left lower door portion 14 presents a tab 15 that is readily accessible for manual sliding of the left door 14, 16. Similarly, the right lower door portion 10 presents a tab 17 that is readily accessible for manual sliding of the right door 10, 12.

Figure 2:
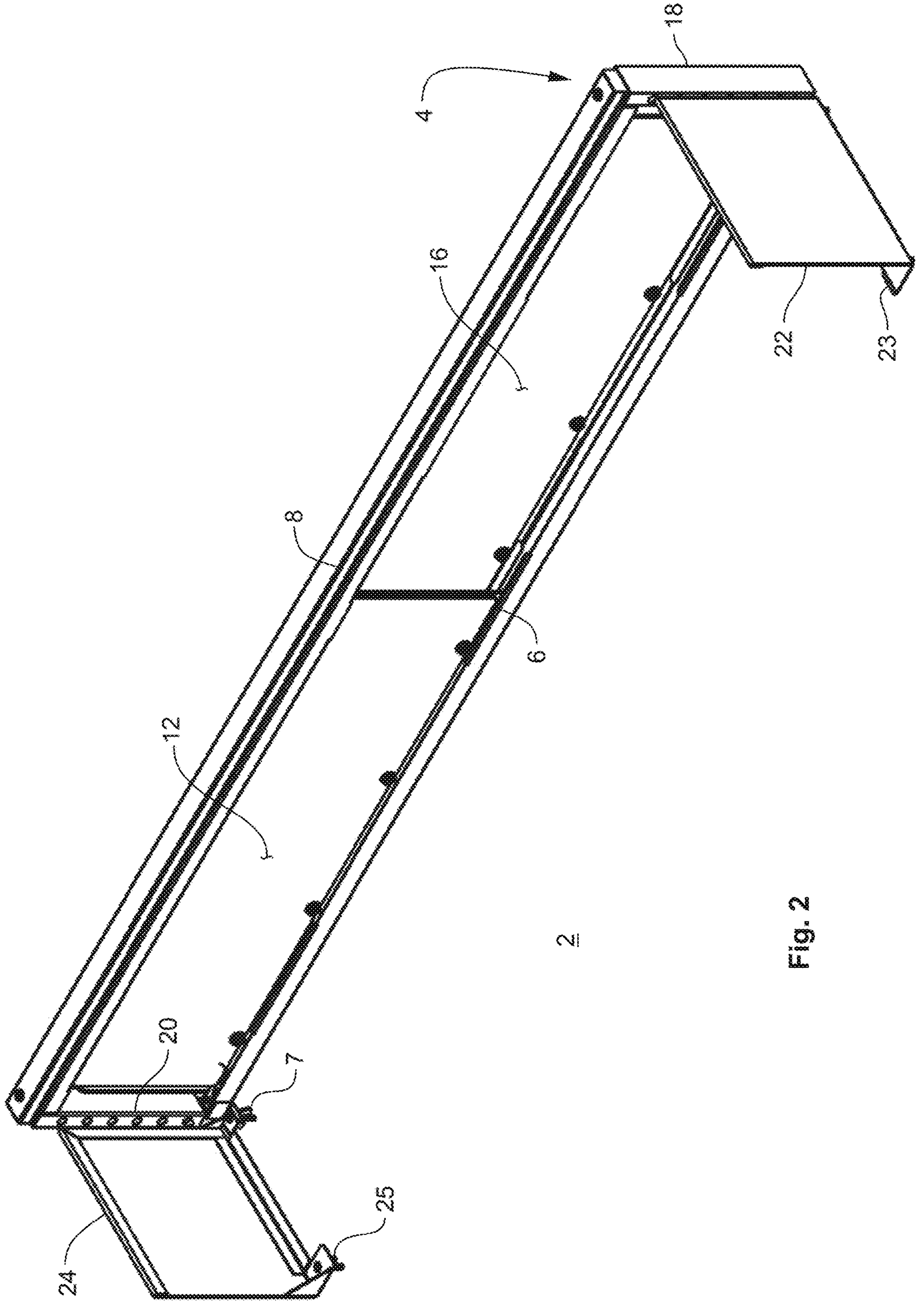
FIG. 2 is a rear perspective view of the self-closing door assembly.

Reference is directed to FIG. 2, which is a rear perspective view drawing of a self-closing door assembly 2, according to an illustrative embodiment of the present invention. This view corresponds with FIG. 1, however, in FIG. 2 the self-closing door assembly 2 is illustrated at its minimum height adjustment. The frame assembly 4 is comprised of a lower guide rail 6, and upper guide rail 8, and a pair of left and right side frames 18, 20. Within the frame assembly 4, and between the upper guide rail 8 and the lower guide rail 6 are a pair of door assemblies with the upper portions 12, 16 visible in this view. The left and right side panels 22, 24 extend rearwardly from the frame assembly 4 to control access from the left and right sides, respectively. Note that fasteners 23, 25 are provided for attachment of the end panels 22, 24 to the host shelving system (not shown). In the illustrative embodiment, threaded fasteners and wing nuts are used to connect to the host shelving system.

Figures 3A, 3B, 3C, 3D:
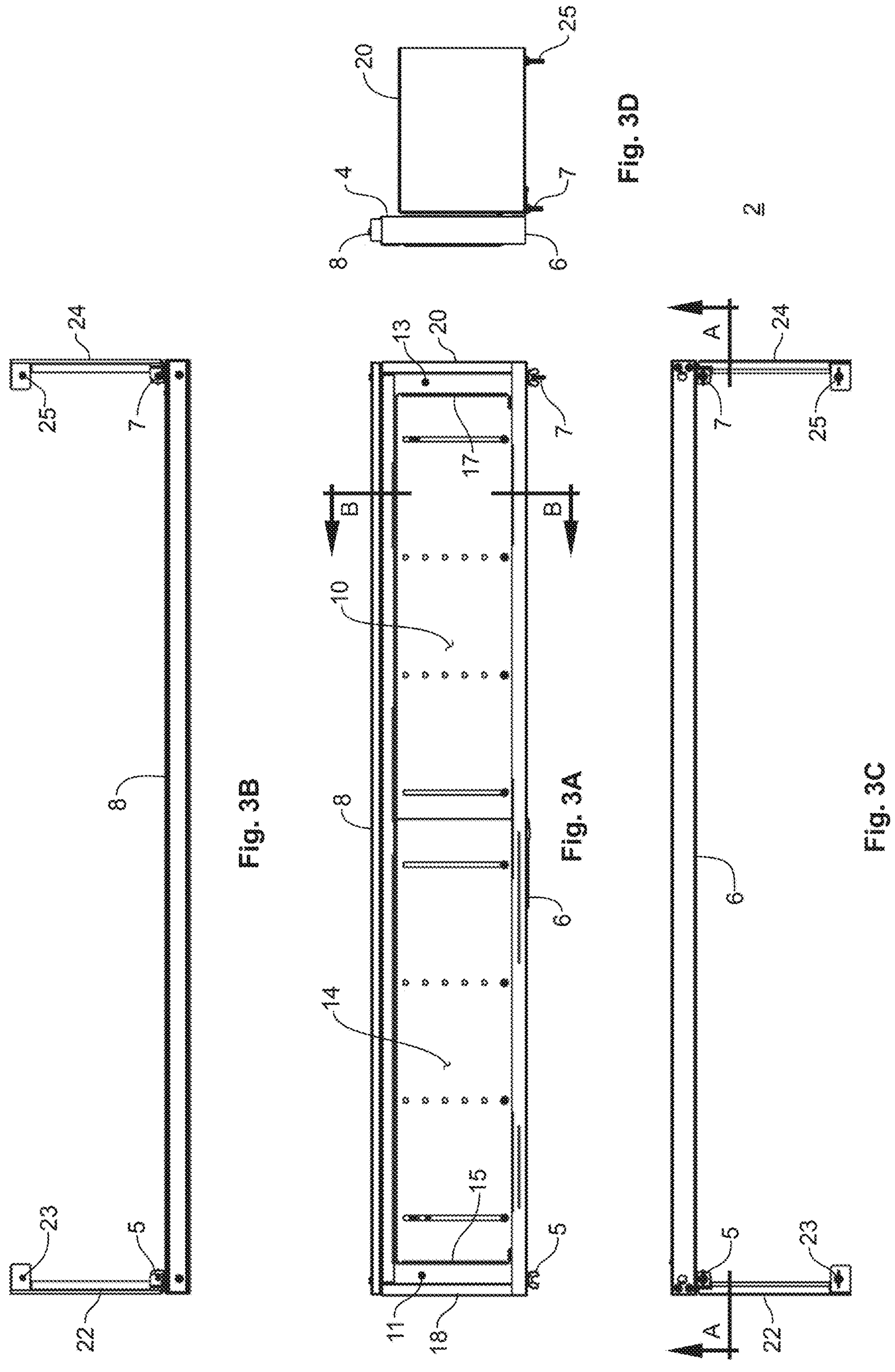
FIGS. 3A, 3B, 3C, and 3D are a front view, a top view drawing, a bottom view drawing, and a side view drawing, respectively, of the self-closing door assembly.

Reference is directed to FIGS. 3A, 3B, 3C, and 3D, which are a front view drawing, a top view drawing, a bottom view drawing, and a side view drawing, respectively, of a self-closing door assembly 2, according to an illustrative embodiment of the present invention. In these views, the assembly 2 is illustrated at its lowest height adjustable range. In the front view 3A, the lower portion of the right door 10 and left door 14 are visible, supported between the lower guide rail 6 and the upper guide rail 8. The side frames 18 and 20 are disposed between these guide rails. Note that the finger tabs 15 on the left door and 17 on the right door are illustrated. Note further that a gap 11 on the left, and a gap 13 on the right, between the respective side frames 18, 20 and lower door portions 14, 10 is provided so that the user can easily use a finger to access the tabs 15, 17 to urge the doors open by sliding action. The top view 3B and bottom view 3C present the end panels 22, 24, as well as certain fasteners. These fasteners include threaded fasteners 23, 25 on the end panels 22, 24, respectively, for connection to the host shelving system (not shown). Similarly, the lower guide rail 6 includes threaded fasteners 5, 7 on the left side and right side, respectively, for attachment to the host shelving system as well. FIG. 3D presents a right hand side view of the self-closing door assembly 2, and illustrates the arrangement of the frame assembly 4, with its lower guide rail 6 and upper guide rail 8, as well as the right side panel 20. In addition, the aforementioned fasteners 7, 25, as illustrated.

Figure 4:
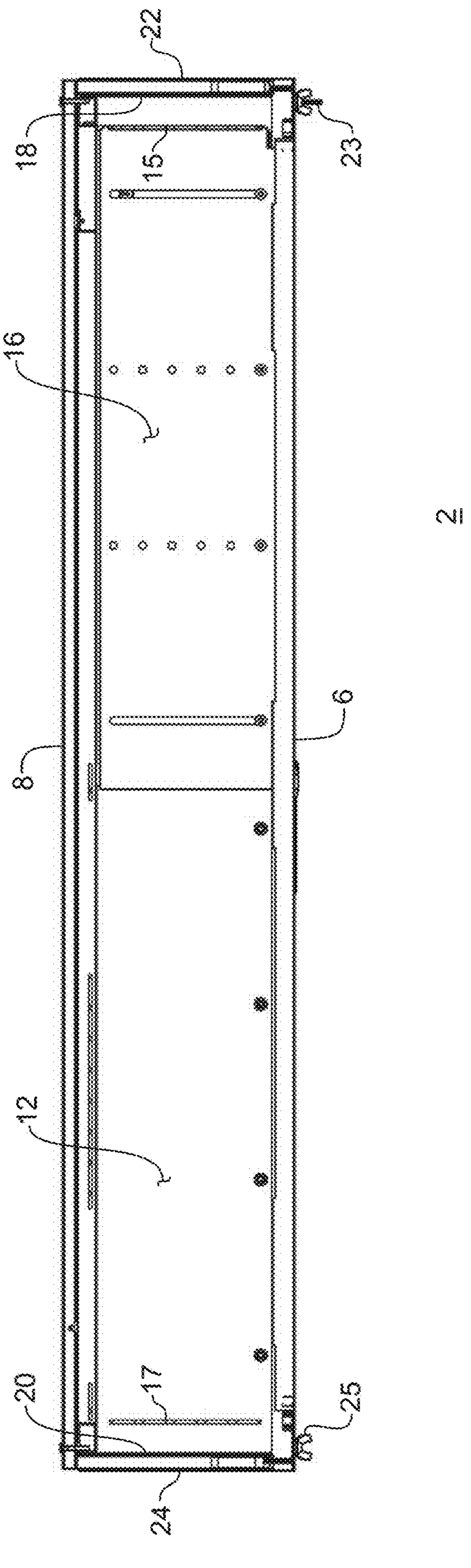
FIG. 4 is a front section view of the self-closing door assembly.

Reference is directed to FIG. 4, which is a front section view drawing, Section A-A, of a self-closing door assembly 2 according to an illustrative embodiment of the present invention. Again, in this FIG. 4 the self-closing door assembly 2 is illustrated at its minimum height adjustment. The frame assembly 4 is comprised of a lower guide rail 6, and upper guide rail 8, and a pair of left and right side frames 18, 20. Within the frame assembly 4, and between the upper guide rail 8 and the lower guide rail 6 are the pair of door assemblies with just the upper portions 12, 16 visible in this view. The left and right side panels 22, 24 extend rearwardly from the frame assembly 4 to control access from the left and right sides, respectively. Note that fasteners 23, 25 are provided for attachment of the end panels 22, 24 to the host shelving system (not shown). In the illustrative embodiment, threaded fasteners and wing nuts are used to connect to the host shelving system. Also note the finger tabs 15, 17, which extend from the lower door portions 16, 12, respectively, for proving convenient user access for opening the doors.

Figure 5:
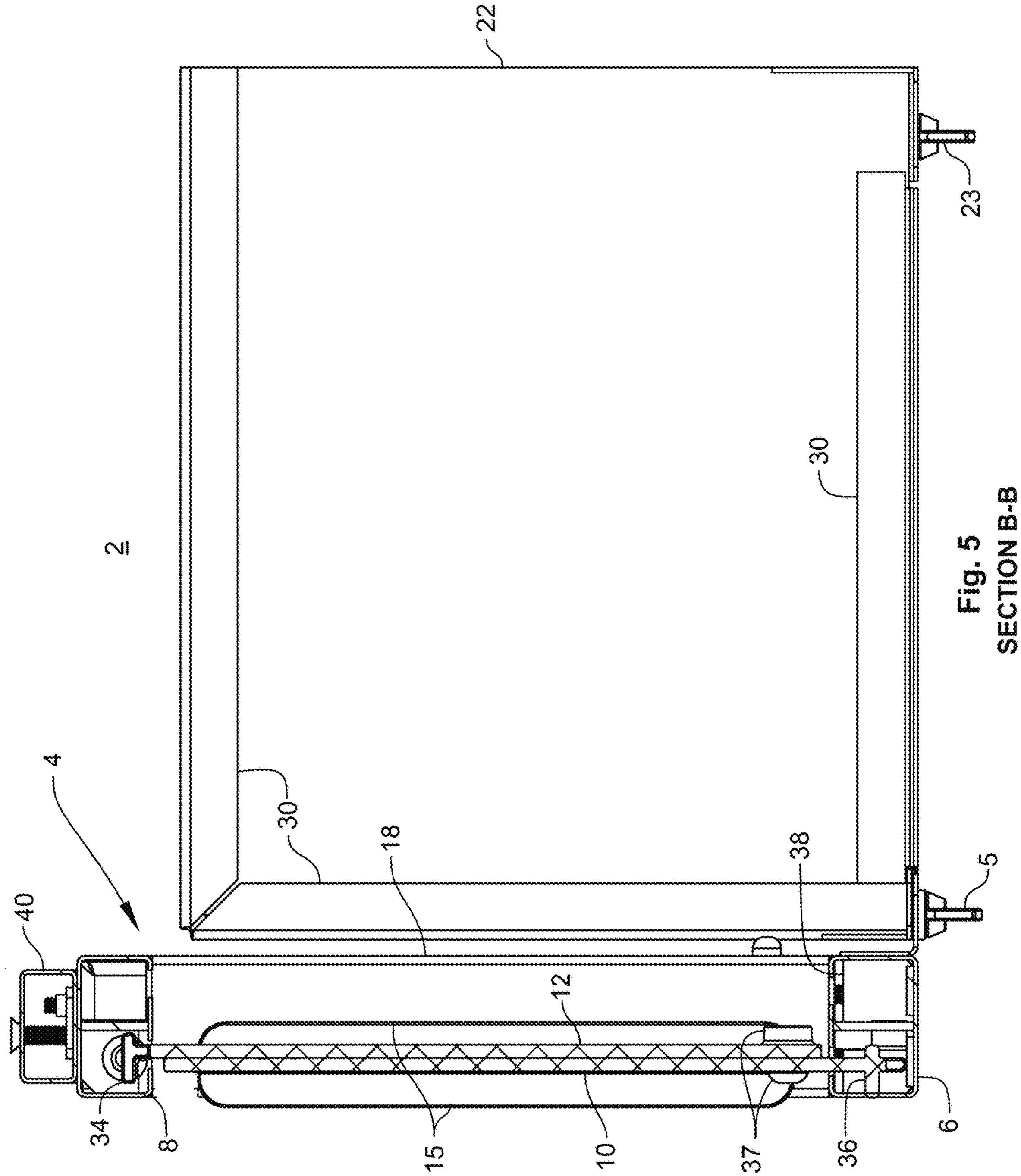
FIG. 5 is a side section view of the self-closing door.

Reference is directed to FIG. 5, which is a side section view drawing, Section B-B, of a self-closing door assembly 2, according to an illustrative embodiment of the present invention. Part of the frame assembly 4 is visible, including the lower guide rail 6, the upper guide rail 8, the left side frame member 18, a shelf attachment member 40 on top of the upper guide rail 8, and a threaded fastener 5 that extends from the lower guide rail 6, as illustrated. The lower left door portion 10 and upper left door portion 12 can been seen in section view. In the illustrative embodiment, the door portions 10, 12 are fabricated from injection molded transparent polycarbonate for strength and to enable product viewing without opening the doors. Note that the molded door portions 10, 12 include guide bosses 36, 34, respectively, which slide within the respective guide rails 6, 8, and serve to locate and retain the door portions within those respective guide rails, as illustrated. Also note the height adjustment fastener 37 used to join the upper and lower door portions

10, 12 after the desired height has been selected. Also note spring 38 located within the lower guide rail 6 portion of the frame assembly 4. In the illustrative embodiment, there are two springs, one for each side of the door upper-lower portion assemblies, which are coiled-strip type constant-force springs, such as the part number 1845N4 clip-on constant-force spring available from McMaster-Carr (see www.mcmaster.com). In this section view, the left side end panel 22 is also visible, and shows details of a folded edge 30 arrangement, which stiffens the steel end panel 22. A threaded fastener 23 extends from the side panel 22 for connection to the host shelving system (not shown).

Figure 6B:
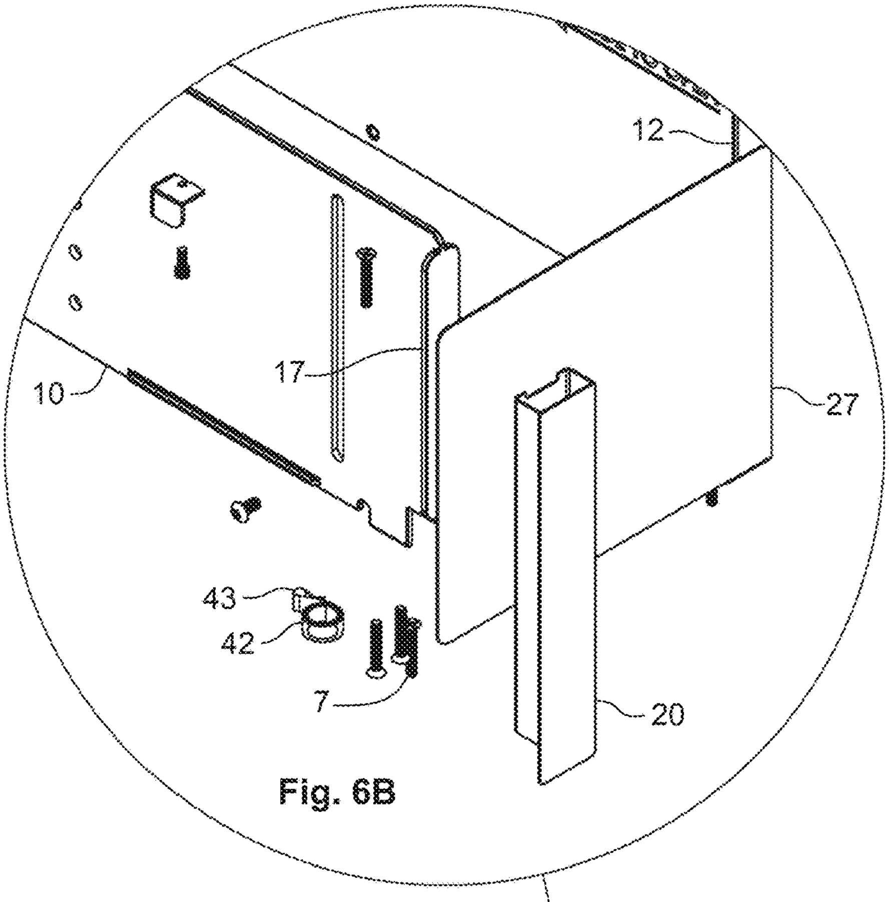
FIGS. 6A and 6B are an exploded perspective view drawing and a corresponding detail drawing, respectively, of the self-closing door assembly.
Figure 6A:
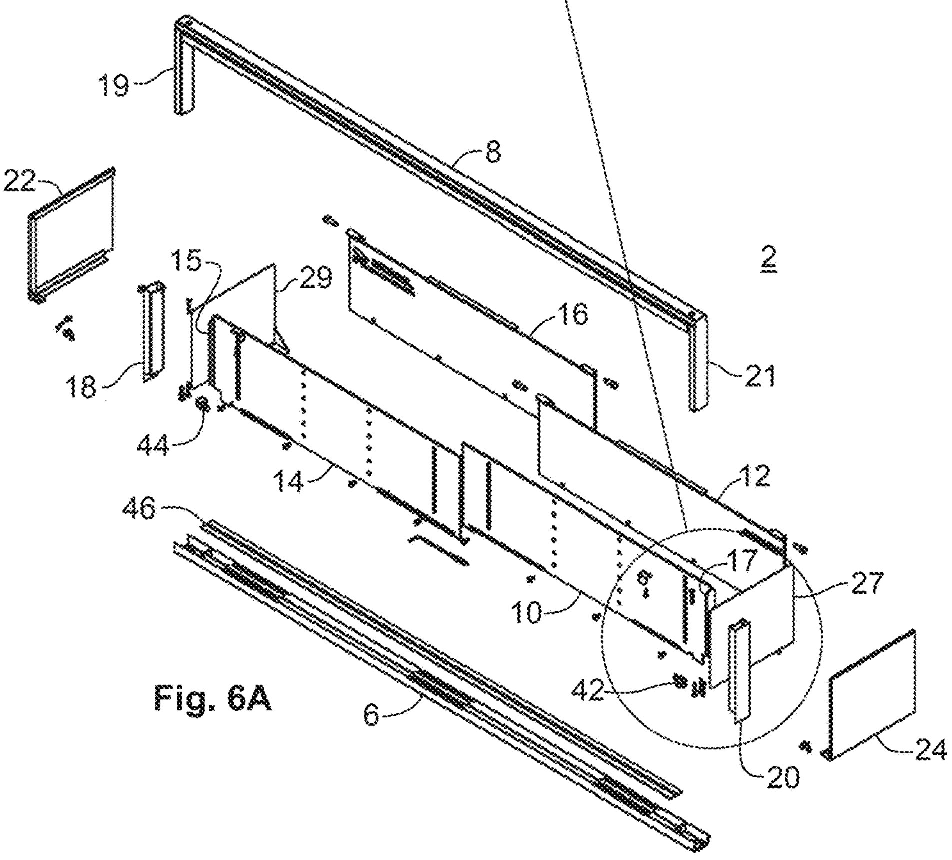

Reference is directed to FIGS. 6A and 6B, which are an exploded perspective view drawing and a corresponding detail drawing, respectively, of a self-closing door assembly 2, according to an illustrative embodiment of the present invention. These views show further elements and assembly details of the illustrative embodiment. The lower guide rail 6, upper guide rail 8, and both the left and right side frames 18, 20 are shown. Note the telescopic side frame members 19, 21 that are attached to the upper guide rail 8, and which are inserted into, and slidably engage the side frames 18, 20, respectively. This arrangement enables the aforementioned adjustable height feature of the illustrative embodiment. Also note the lower guide rail 6 divider 46, which serves to define separate guide paths for the left lower door portion 14 and the right lower door portion 10 as they traverse the guide rail 6. The upper left door portion 16 adjustably engages the lower left door portion 14, and the upper right door portion 12 adjustably engages the lower right door portion 10, to thereby enable corresponding adjustment of the door height. The access tabs 15 of the lower left door portion and access tab 17 of the lower right door portion are also illustrated. These are molded together with the door panels during manufacture. Note also, the left constant-force spring 44 and the right constant-force spring 42, which are contained within the left and right ends, respectively, of the lower guide rail 6, and which extend to engage and urge their respective door portions 14, 10 to automatically close after being manually urged open by a user. The left end panel 22 and right end panel 24 are also illustrated. But note the inner left and right end panels 29, 27, respectively, which are provided to present a smooth and attractive interior surface within the protected shelf space. FIG. 6B provides finer details information, including the threaded fastener 7 for connection to the host shelf (not shown) and the right constant-force spring 42 showing its door portion engaging clip extension 43.

Figure 7A:
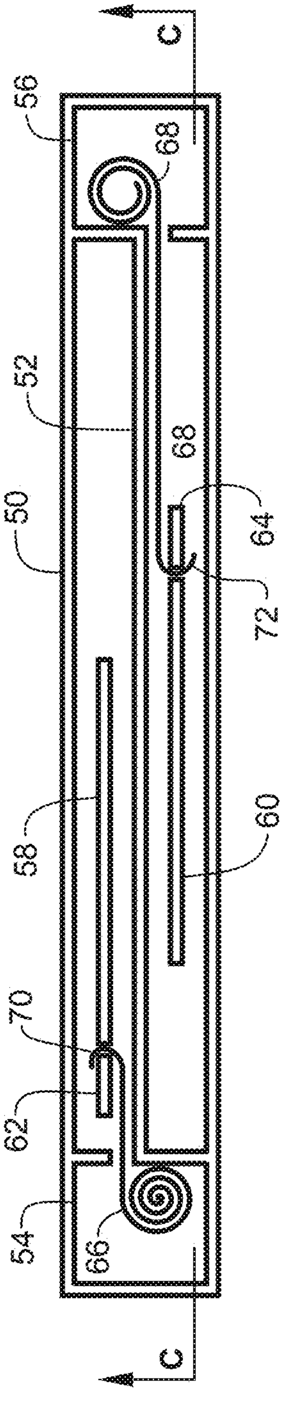
FIGS. 7A and 7B are a top view functional diagram and a front view functional diagram, respectively, of the self-closing door assembly.
Figure 7B:
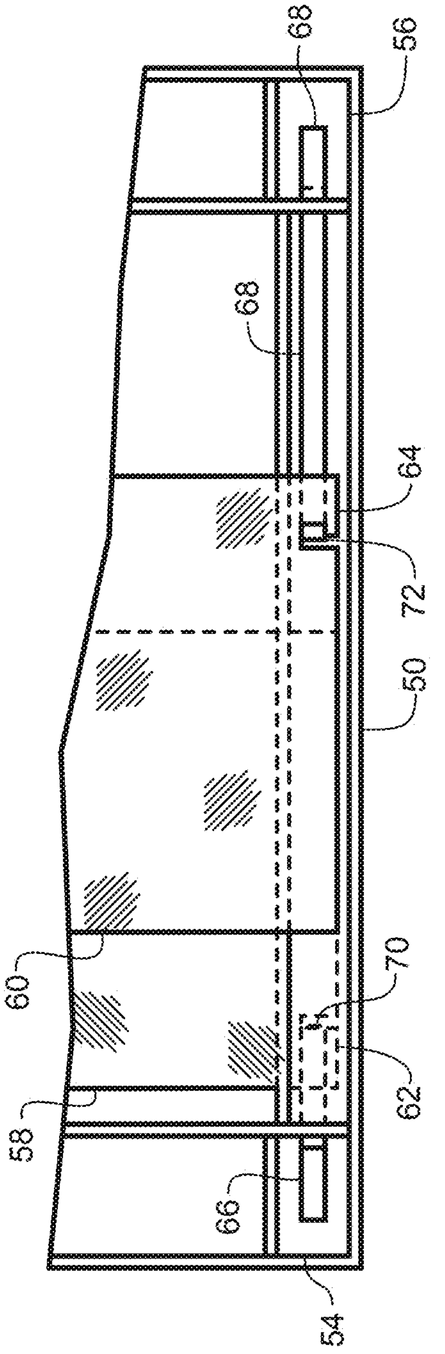

Reference is directed to FIGS. 7A and 7B, which are a top view functional diagram and a front section view, Section C-C, functional diagram, respectively, of a self-closing door assembly according to an illustrative embodiment of the present invention. These views present a generic arrangement of the left and right door portions 58, 60, respectively, and their corresponding constant-force springs 66, 68, and how they are arranged in the lower guide rail 50. The lower guide rail 50 is divided into two sections by divider 52 such that the left door portion 58 and right door portion 60 slide within separate guide channels, as illustrated. Left end compartment 54 retains left constant-force spring 66 therein. Right end compartment 56 retains right constant-force spring 68 therein. The left spring 66 extends to a left clip 70 that engages a tab 62 on the left door 58, which thereby enables left constant-force spring 66 to urge the left door portion 58 back to its closed position after it is manually released by a user. Similarly, the right spring 68 extends to a right clip 72 that engages a tab 64 on the right door 60, which thereby enables right constant-force spring 68 to urge the right door portion 60 back to its closed position after it is manually released by a user.

Figure 8B:
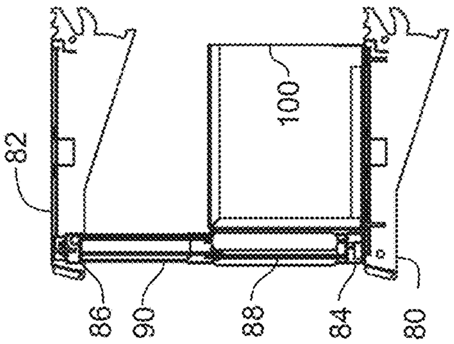
FIGS. 8A and 8B are a front view and a side section view, respectively, of the self-closing door assembly in an extended position.
Figure 8A:
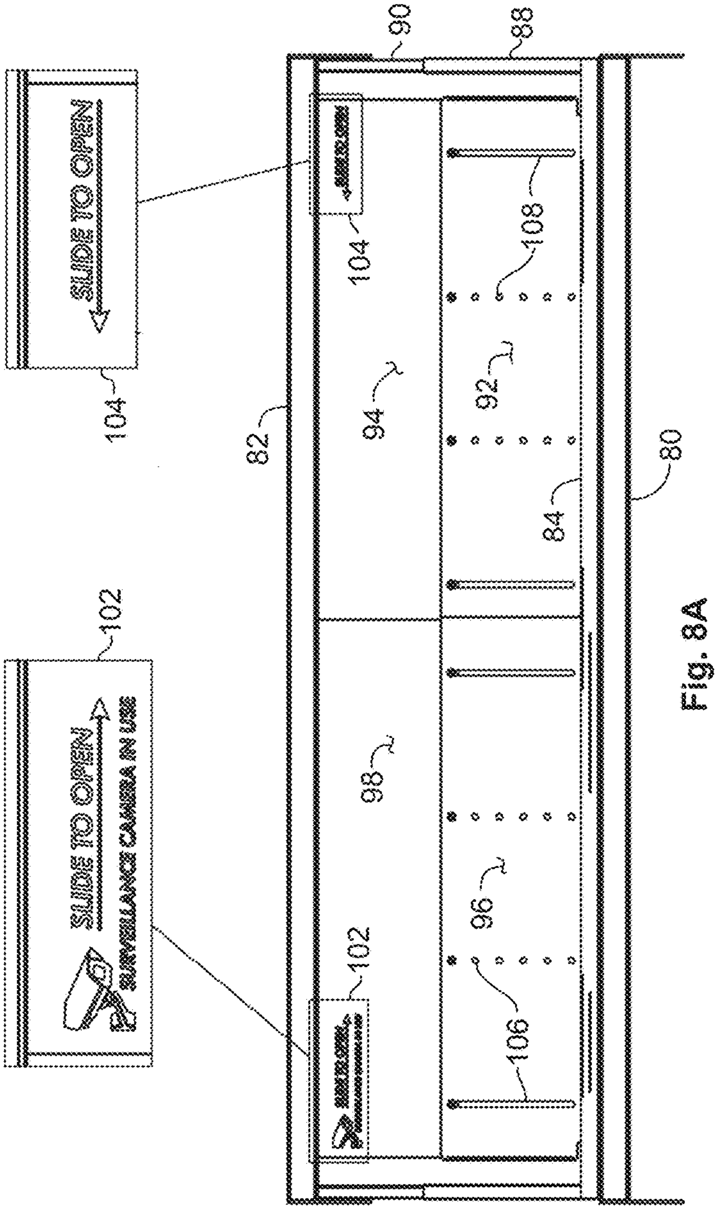

Reference is directed to FIGS. 8A and 8B, which are a front view drawing and a side section view drawing, respectively, of a self-closing door assembly in an extended position and fixed to a shelving system according to an illustrative embodiment of the present invention. The shelving system comprises a lower shelf 80 and an upper shelf 82, as is typical in modern gondola shelving systems known to those skilled in the art. The self-closing door assembly includes the lower guide rail 84 and upper guide rail 86 that are fixed by threaded fasteners to the corresponding shelves 80, 82, as illustrated. Telescopic side frame 88, 90 on both sides of the assembly extend between the guide rails 80, 82 to accommodate the shelf spacing, as illustrated. Disposed between the guide rails 84, 86 is the door assembly comprising a lower left door portion 96 and an upper left door portion 98, as well as a lower right door portion 92 and an upper right door portion 94. The left door portions 96, 98 are adjustable, joined by slots or rows of holes 106 using threaded fasteners (not shown), which are fixed at the desired height. Likewise, the right door portions 92, 94 are adjustable, joined by slots or rows of holes 108 using threaded fasteners (not shown). Instructional graphics 102, 104 may be provided to instruct users on operation of the assembly. End panels 100 are also provided on the left and right side of the assembly, as illustrated. With this arrangement, the self-closing door assembly can be adjusted to accommodate the shelf 80, 82 spacing.

Figure 9B:
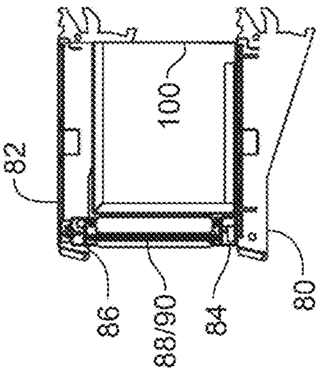
FIGS. 9A and 9B are a front view and a side section view, respectively, of the self-closing door assembly in a retracted position.
Figure 9A:
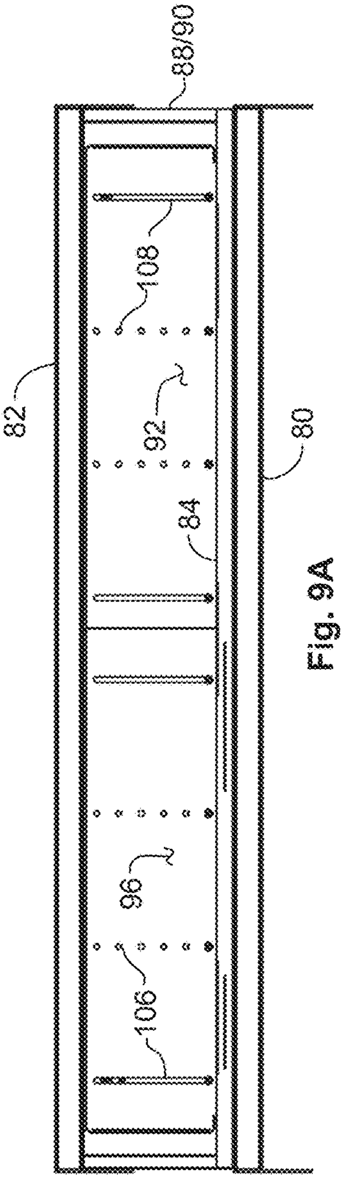

Reference is directed to FIGS. 9A and 9B, which are a front view drawing and a side section view drawing, respectively, of a self-closing door assembly in a retracted position according to an illustrative embodiment of the present invention. These views correspond with those of FIGS. 8A and 8B. In FIGS. 9A and 9B, the shelving system comprises a lower shelf 80 and an upper shelf 82. The self-closing door assembly includes the lower guide rail 84 and upper guide rail 86 that are fixed by threaded fasteners to the corresponding shelves 80, 82, as illustrated. Telescopic side frame 88, 90 on both sides of the assembly extend between the guide rails 80, 82 to accommodate the shelf spacing, which is set to the minimum height in these views. Disposed between the guide rails 84, 86 is the door assembly comprising the four door panels, with just the lower left door portion 96 and lower right door portion 92 visible in these views.

Figure 10:
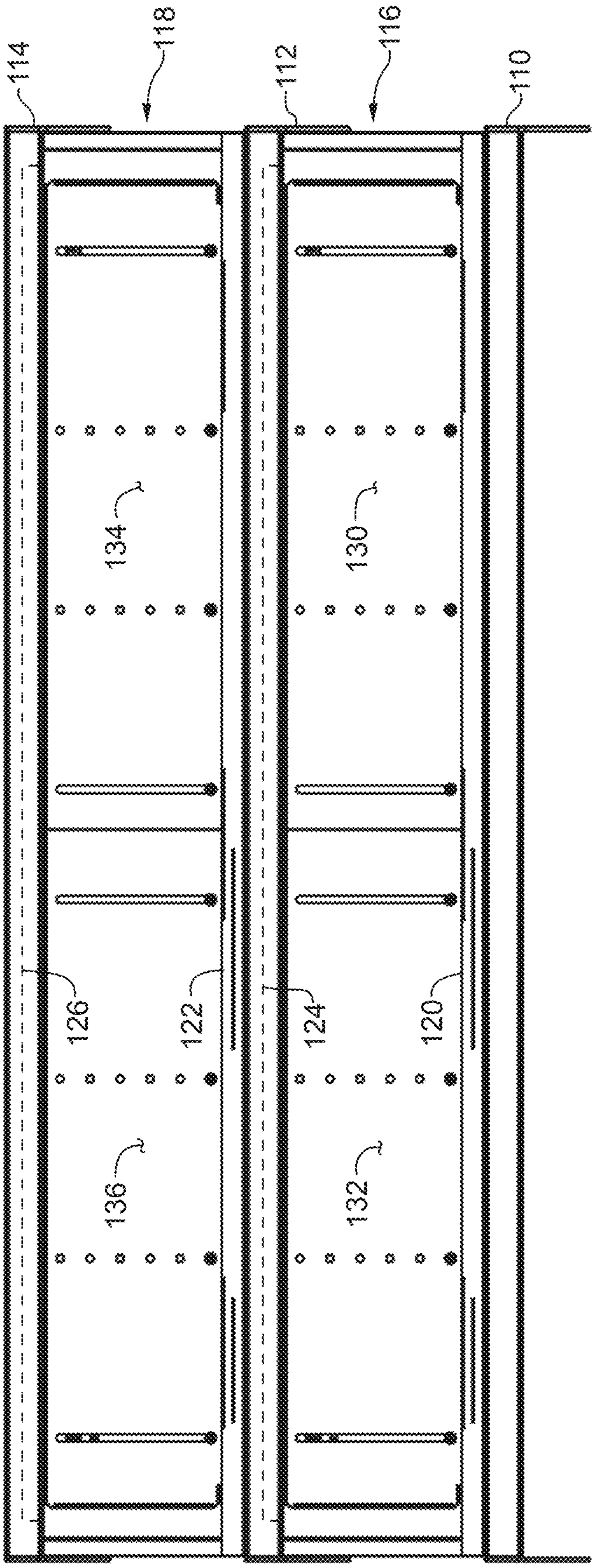
FIG. 10 is a front view of a pair of self-closing door assemblies installed in a shelving system.

Reference is directed to FIG. 10, which is a front view drawing of a pair of self-closing door assemblies 116, 118 installed in a shelving system according to an illustrative embodiment of the present invention. This view presents the arrangement when the illustrative embodiment self-closing door assemblies are stacked into two shelves on a multiple shelf shelving system, as illustrated. Three shelves 110, 112, 114 support two self-closing door assemblies 116, 118 there-between. The lower assembly 116 includes a lower and upper guide rails 120, 124, respectively, and, the upper assembly 118 includes a lower and upper guide rail 122, 126, respectively, all of which are fastened to the adjacent shelves 110, 112, 114 using threaded fasteners. The lower assembly includes left door 132 and right door 130. Likewise, the upper assembly includes a left door 136 and right door 134.

Reference is directed to FIGS. 11A, 11B, 11C, and 11D, which are a side section view drawing and three detailed section view drawings, respectively, of a pair of self-closing door assemblies 116, 118 installed in a shelving system according to an illustrative embodiment of the present invention. These figures correspond with FIG. 10. In FIGS.

Figures 11A, 11B, 11C, 11D:
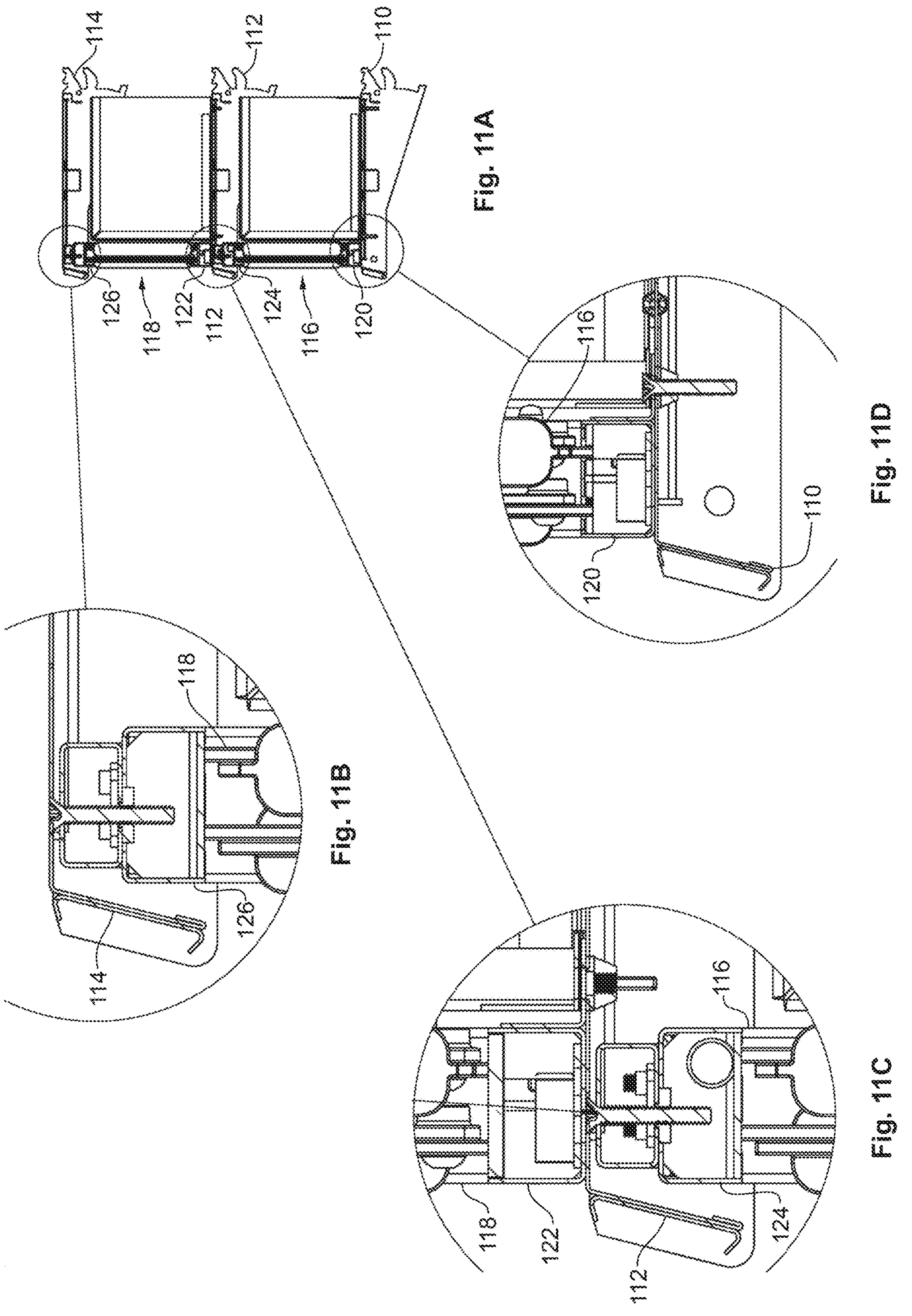
FIGS. 11A, 11B, 11C, and 11D are a side section view and three detailed section views, respectively, of a pair of self-closing door assemblies installed in a shelving system.

11A, B, C, and D, three shelves 110, 112, 114 support two self-closing door assemblies 116, 118 there-between. The lower assembly 116 includes a lower guide rail 120 fixed to the lower shelf 110 as illustrated in FIG. 11D. The lower assembly also includes an upper guide rail 124 fixed to the bottom of middle shelf 112 with threaded fasteners, as illustrated in FIG. 11C. Similarly, the upper assembly 118 includes a lower guide rail 122 fixed to the top of middle shelf 112, also as illustrated in FIG. 11C. The upper assembly 118 also includes an upper guide rail 126 fixed to the bottom of upper shelf 114 with threaded fasteners, as illustrated in FIG. 11B.

Figure 12:
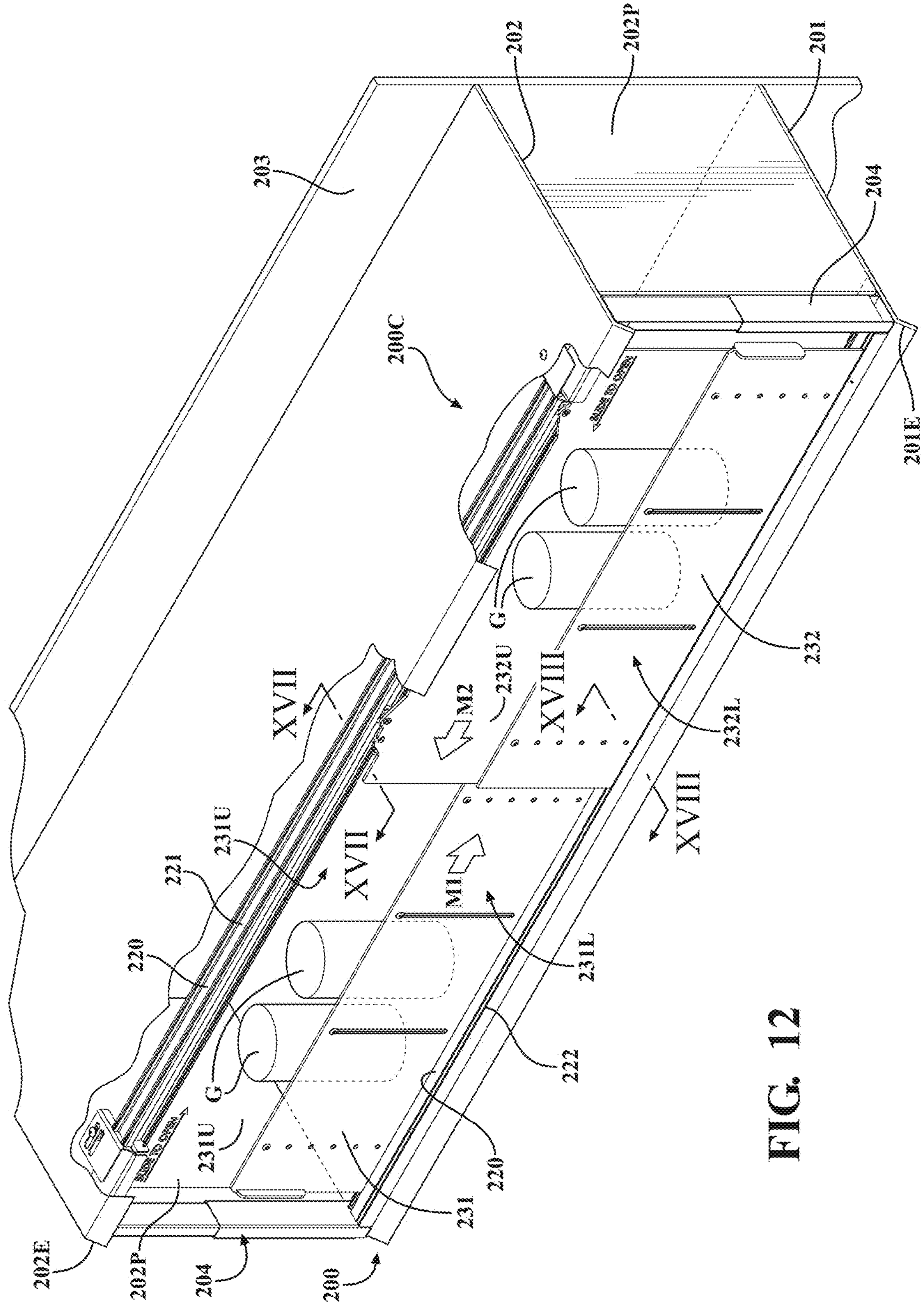
FIG. 12 is a front perspective view of a self-closing door assembly of a first alternative embodiment.
Figure 13:
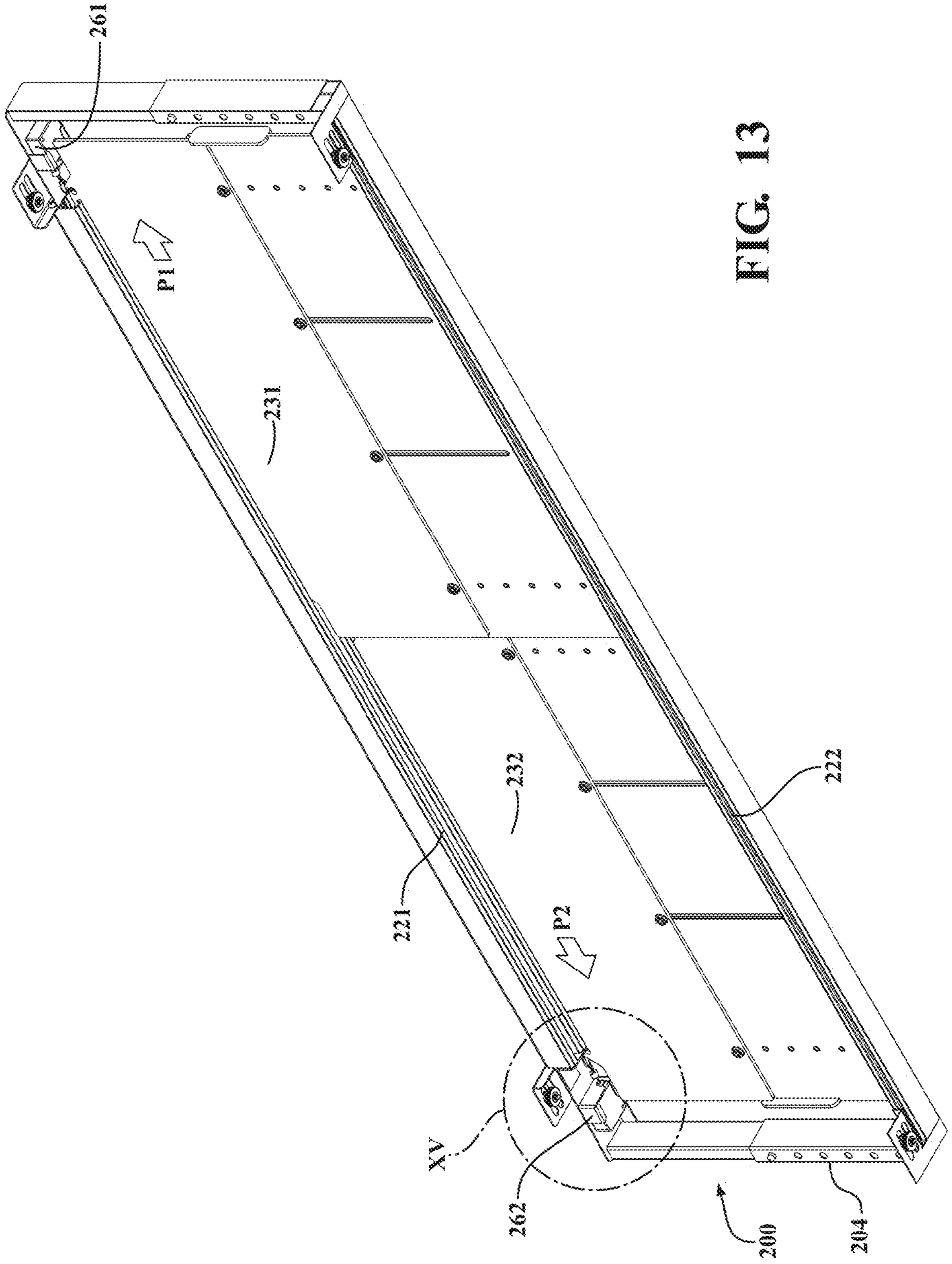
FIG. 13 is a rear perspective view of the self-closing door assembly of the first alternative embodiment.

A first alternative embodiment of the self-closing door assembly is shown in FIGS. 12-18 and generally designated 200. This self-closing door assembly can be identical to or similar to the embodiment described above in structure, function and operation with several exceptions. For example, like the embodiment above, the self-closing door assembly 200 is associated with a first shelf 201 and a second shelf 202 that are secured to a wall, rack or gondola 203 or some other support structure of a store or retail location to form a security case 200C. The first shelf 201 and second shelf 202 can be similar to the shelves described in the embodiments above. The first shelf 201 can extend forwardly from the wall structure 203, which is shown as an upright vertical wall structure, but can be of other structures and orientations. The first shelf can include a front edge 201E that can extend forwardly of the self-closing door assembly 200 as shown in FIG. 12. The second shelf 202 can be disposed a preselected distance above the first shelf 201. A variety of goods G can be disposed on and/or displayed on the first shelf 201. Of course, additional goods can be disposed on the second shelf 202 and a variety of other shelves if included in a particular application. Moreover, the self-closing door assembly 200 can be associated with one or more other shelves that are not shown to provide an enclosure for the goods G when displayed on any of the shelves. Further, although not shown in FIG. 12, the shelving system and/or assembly 200 can comprise side panels 202P similar to those described in the embodiments above to form a further enclosure with the other components in the security case 200C. Collectively or individually, the components such as these shelves 201, 202 and supporting structure 203 can form a shelving system.

As with the embodiment above, the self-closing door assembly 200 can include a frame assembly 204. The frame assembly can include all the components of the embodiment described above and therefore will not be described again in detail. The frame assembly 204 can be configured to be fixedly joined with the shelving system adjacent the front edge 201E of the first shelf 201 as described in the embodiment above. Further, the frame assembly 204 can include or be joined with a guide rail assembly 220 which can comprise the first guide rail 221 and a second guide rail 222. This guide rail assembly 220 and the respective first and second guide rails, can be configured to be positioned in a fixed relationship to the frame assembly 204 and substantially parallel to the front edge 201E of the first shelf 201 and/or the front edge 202E of the second shelf 202.

The first guide rail 221 and second guide rail 222 can be spaced from one another with a first door 231 and a second door 232 disposed therebetween. The first door 231 and second door 232 can be similar or identical to the first and second doors mentioned in the embodiment above. For example, these doors can include upper portions 231U, 232U and lower portions 231L, 232L which can be height adjustable and can include similar or identical components to make them height adjustable as with the first and second doors of the self-closing door assembly of the current embodiment described above.

As shown in FIGS. 12-14 and 17-18, the guide rail assembly 220 can be outfitted to slidingly receive the first door 231 and the second door 232 in a left-right sliding or moving orientation and configuration. These doors can be disposed in an overlapping configuration when one door is slid to an open position while the other door is in a closed or partially closed position or vice versa, or generally whenever there is an overlap between the doors. There also can be only one door, two doors, or additional multiple doors in the assembly.

Figure 17:
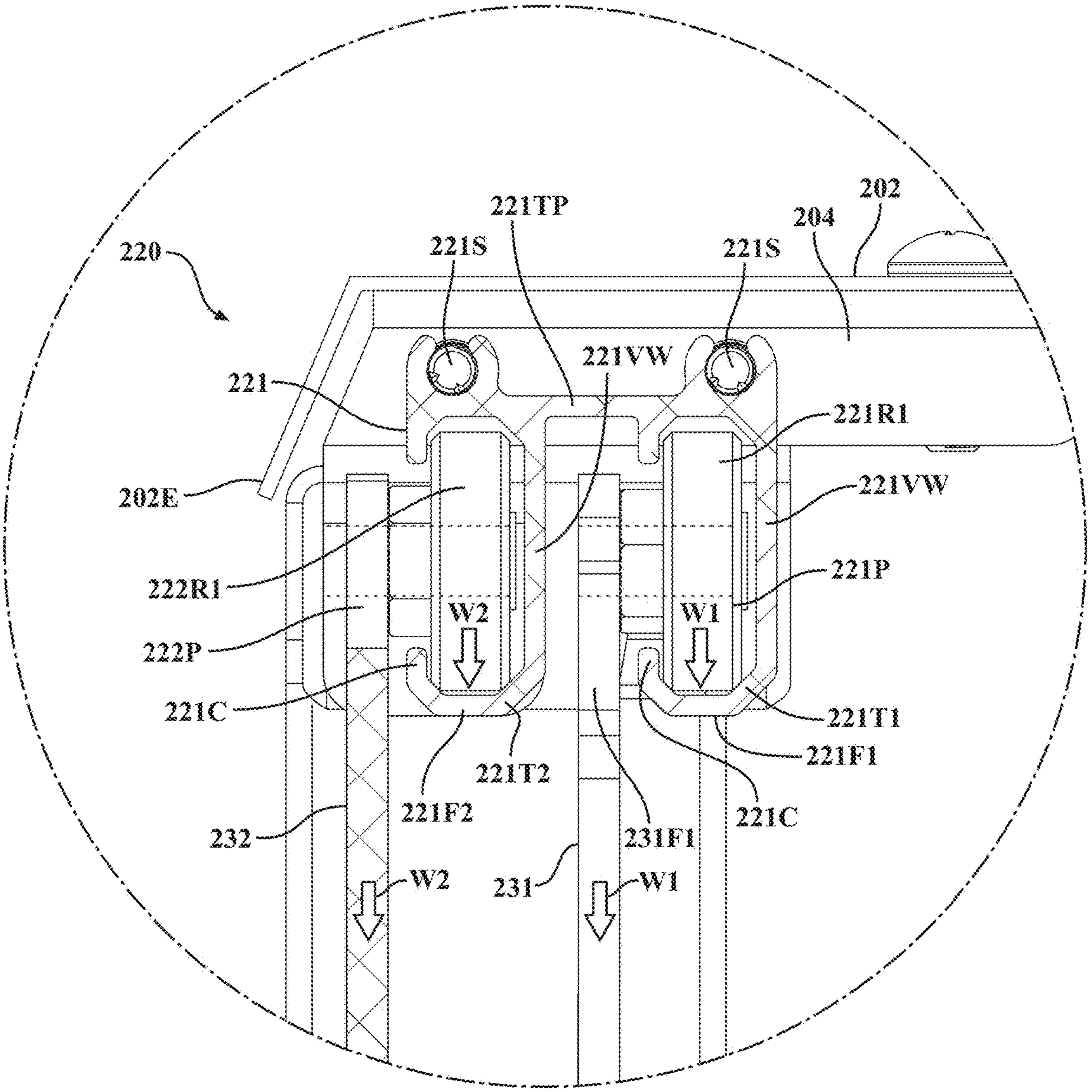
FIG. 17 is a section view of the door assembly showing an upper guide rail of a guide assembly of the self-closing door assembly, further illustrating rollers in tracks to suspend the first door taken from FIG. 12.
Figure 18:
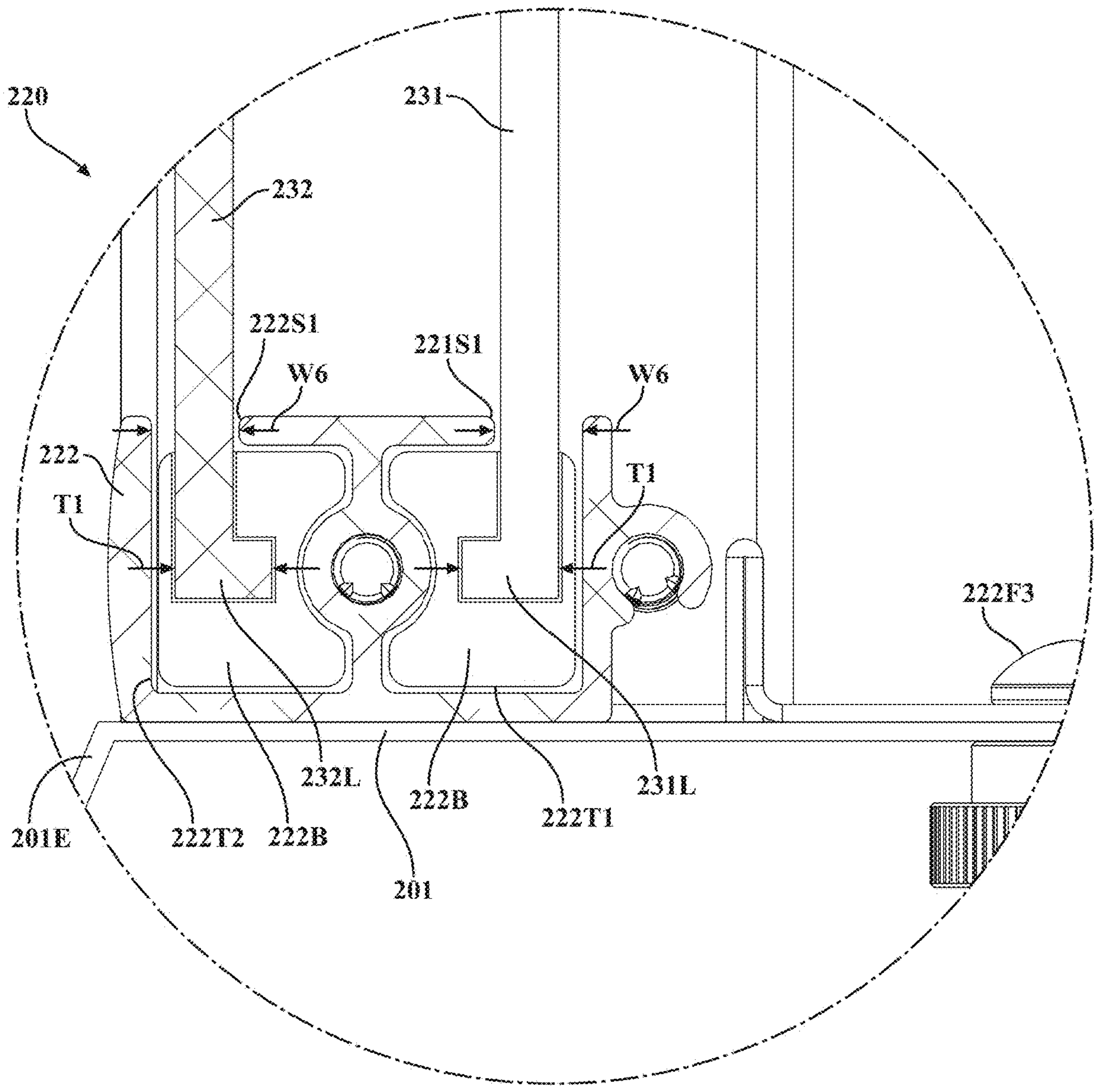
FIG. 18 is a section view of the door assembly showing a lower guide rail of a guide assembly of the self-closing door assembly, further illustrating lower portions of the first door and a second door suspended in a lower track taken from FIG. 12.

The guide rail assembly 220 shown in FIG. 17 can include a first guide rail 221. This first guide rail can be secured to the frame assembly 204 via fasteners, rods or screws 221S that can mount to a vertical upright of the frame system assembly 204 or some other component thereof or of the shelving system. As shown in FIG. 17, the first guide rail 221 can be disposed adjacent and/or rearward of the front edge 202E of the shelf 202 which can be the second shelf or the upper shelf of the shelving system shown in FIG. 12. As shown in FIG. 18, the second guide rail 222 can be mounted adjacent, behind and/or near the front edge 201E of the shelf 201 which can be the first shelf or lower shelf. As illustrated, the first shelf 201 can be a lower shelf disposed below the upper shelf 202.

With reference to FIG. 17, the first door 231 and the second door 232 can be vertically suspended along the first guide rail 221. As an example, the weight W1 of the first door 231 can be transferred through that door to the first guide rail 221. Likewise, the weight W2 of the second door 232 can be transferred to the first guide rail 221. In this manner, the first guide rail 221 can support substantially and/or entirely the weight W1 of the first door 231 and substantially and/or entirely the weight W2 of the second door 232. The first guide rail 221 and the doors 231 and 232, however are movably joined with one another. The first door can be movable along the first guide rail 221 to thereby move laterally in direction M1 from a first closed position, shown in FIG. 12, to move behind or adjacent the second door 232. Likewise, the second door 232 can be movable along the first guide rail 221 in direction M2 to thereby move laterally from a second closed position, shown in FIG. 12, to move forward of or adjacent the first door 231. Optionally, the doors can be in other overlapping configurations in the open and closed positions. When either door 231 or 232 is in the first closed position, it can interfere with manual access to the goods G disposed on the first shelf or otherwise behind the doors. Likewise, when either of the doors 231 or 232 is moved to the respective first open position or second open position, the moved door enables access to the goods G disposed on the shelf 201 or otherwise behind the doors.

As mentioned above, the guide assembly 220 can include the first guide rail 221 and the second guide rail 222. The first guide rail 221 can be disposed generally above the first and second doors 231 and 232, while the second guide rail 222 can be disposed below the first and second doors 231 and 232. The first guide rail 221 shown in FIG. 17 can include a first track 221T1 and a second track 221T2. The first guide rail 221 and each of its tracks can be configured to be disposed adjacent and parallel to the second front edge 202E of the second shelf 202. The first guide rail 221 can be configured to be disposed below the second shelf 202. As referred to herein, a shelf can comprise and include any shelf, panel, sheet, wall or other structure that is generally horizontally oriented in use or during its normal function and operation, and optionally can support the goods G and/or form a closure portion of the shelving assembly. The first guide rail 221 can be joined with the frame assembly 204 as described above using fasteners 221S. The first guide rail also can include a first support flange 221F1 that extends along and/or adjacent to the second front edge 202E as shown again in FIG. 17. Likewise, the second track 221T2 can include a second support flange 221F2 that extends along the front edge. Each of the support flanges 221F and 221F2 can support the weights W1 and W2 of the respective doors 231 and 232.

More particularly, the first support flange 221F1 and the second support flange 221F2 can extend from respective vertical walls 221VW that extend downwardly from a top plate 221TP shown in FIG. 17. Optional containment walls 221C can be adjacent the respective support flanges 221F1 and 221F2. These containment walls can ensure and/or guide the respective movable elements 221R1 and 221R2 which are movably joined with the respective first door 231 and second door 232. As shown, these movable elements 221R1 and 222R2 can be in the form of rollers which are rollably received on respective posts 221P and 222P that are further coupled to the doors 231 and 232. These posts can be in the form of shafts, pins, fasteners, screws, bolts or other elongated elements that can be screwed, threaded, glued, cemented, friction fit or otherwise joined with the respective doors 231 and 232 in a generally fixed manner. The rollers optionally can be in the form of bushings, bearings, wheels, coasters, or other round or cylindrical elements, all referred to herein as rollers, that generally can roll relative to the first guide rail 221 and its respective tracks 221T1 and 221T2. Generally, each of the rollers rotate, roll or otherwise translate, slide or move on the respective support flanges 221F1 and 221F2 as the first door transitions to the first open position from the first closed position, the first door transitions from the first closed position to the first open position, the second door transitions to the second open position from the second closed position, and/or the second door transitions from the second closed position to the second open position, or to differing degrees of open or closed positions. As the respective first and second doors translate and the rollers 221R1, 222R1, for example, rotate, they each have a point of contact with the respective support flanges 221F1 and 221F2. At these points of contact, the weights or portions of the weights W1 and W2 of the respective doors is transferred to the respective support flanges, tracks and thus the first guide rail 221.

Figure 14:
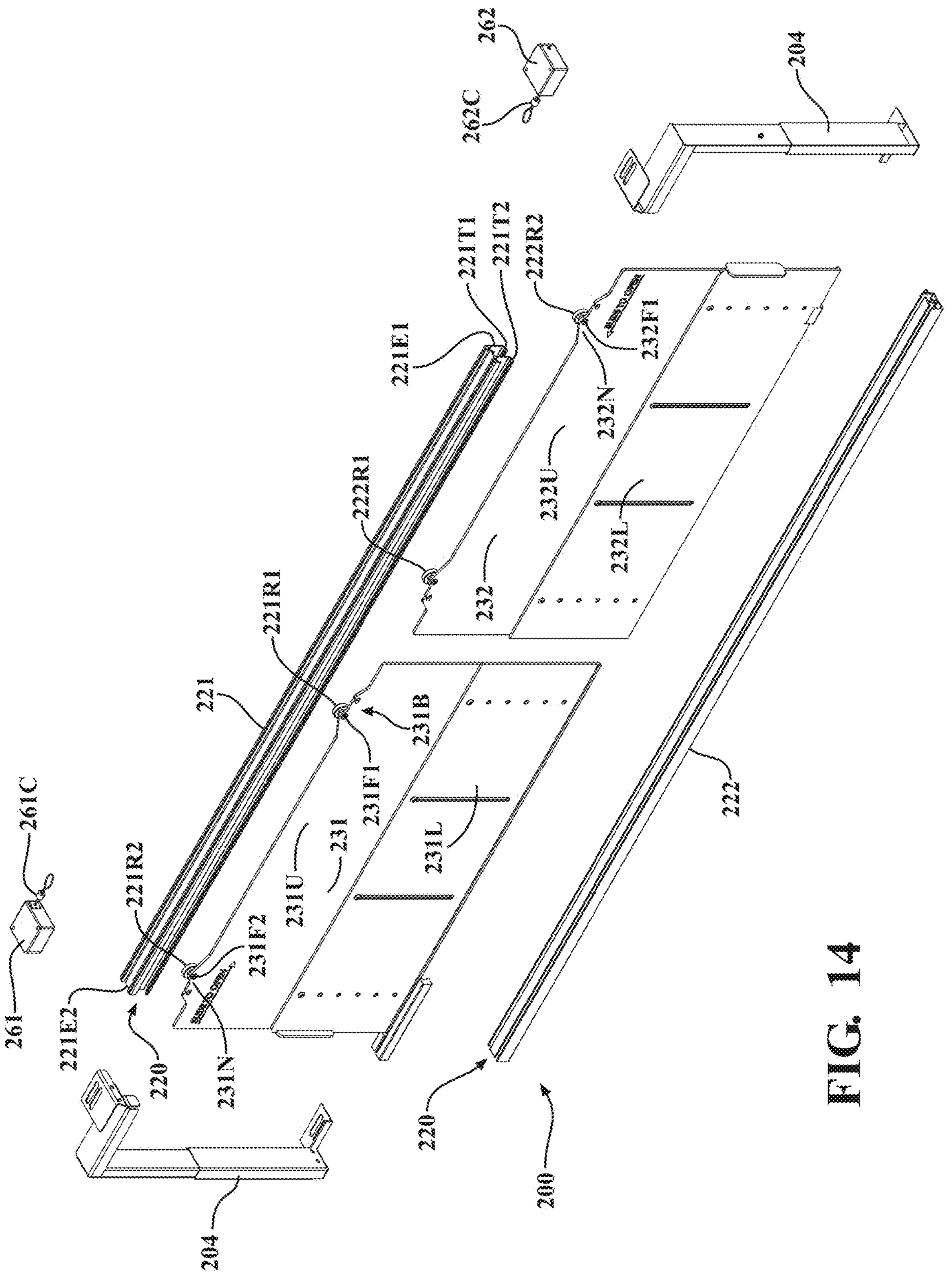
FIG. 14 is an exploded perspective view of the self-closing door assembly.

As shown in FIG. 14, the first door 231 and the second door 232 can include multiple rollers. For example, the upper portion 231U of the first door 231 can include an upwardly extending flange or tab 231F1 and a second upwardly extending flange or tab 231F2. Optionally, these tabs can form a portion of a transparent upper portion 231U and extend upwardly from the main body 231B of that upper portion. The tabs can be thin enough to fit between the respective tracks. For example, as shown in FIG. 17, the tab 231F1 is thin enough to fit between the track 221T1 and track 221T2, while still providing movement of the first door 231 between the first closed mode and the first open mode. The door 231 also can include the second flange 231F2 which can include another roller 221R2 which can be distal from the first roller 221R1 on the same door. Thus, the door can be supported at opposing ends by different rollers to provide a simple suspension of that door vertically. With these rollers, the door essentially is hung and can glide along the first guide rail 221, being suspended therefrom without any other substantial support from the frame assembly 204 and/or the second guide rail 222 that is disposed below the doors 231 and 232. Of course, additional rollers and flanges can be joined with the first door and/or the second door to provide additional support. Moreover, the second door 232 can include an additional roller 222 R2 as shown in FIG. 14, which can operate similar to the other rollers associated with the second door and/or the first door. Typically, each of the rollers on the first door can be disposed in one track, while each of the rollers on the second door can be disposed in the second adjacent track of the first guide rail.

The guide assembly 220 as mentioned above can include the second guide rail 222, which also can be referred to as a lower guide rail. This lower guide rail can slidably engage the lower portions of the first door 231 and the second door 232, optionally without supporting the mass or weight of those doors. Generally, the second guide rail 222 can be fastened or secured to the first shelf 201 via fastener 222F3. The lower guide rail 222 also can be adjacent and parallel to the first shelf front edge 201E. The second guide rail 222 can be secured with other fasteners to the frame 204 depending on the application. The lower guide rail 222, however, optionally does not support the first door or the second door in any substantial manner. The lower guide rail can primarily only slidably or frictionally engage the lower portions of the first door and the second door, but do not support those doors. Most, if not all, the weights W1 and W2 of the respective doors are borne by the first guide rail 221.

Optionally, as shown in FIG. 18, each of the doors can extend downwardly through respective slots 222S1 and 222S2. Each of the doors optionally can include lower legs 231L and 232L that can face optionally toward one another. The legs can be of a thickness T1 that is less than the width W6 of the respective slots 221S1 and 222S2 to maintain the lower portions of the doors in the guide rail 222. Of course, the legs can be absent from the lower portions of the doors and planar panels can simply extend into the bumper 222B or the lower guide rail. In some cases, the lower guide rail 222 can be outfitted with a bumper 222B that can be disposed in each of the respective tracks or compartments 222T1 and 222T2. This bumper 222B can extend along only a portion for the full length of the track or guide rail 222, depending on the application. Generally, the bumper can center the doors in their respective slots. The bumper 222B can be constructed from a polymer, such as nylon, PTFE, polypropylene, polyethylene, UMHW, PVC, HDPE, PTFE, PPS rubber or some other low friction material to allow the doors to glide easily from the open position to the closed position and vice versa.

As mentioned above, the first alternative embodiment shown in FIG. 12-18 can include self-closing doors. The closing mechanism to provide the self-closing or automatic closure for the doors optionally can comprise a first biasing member 261 and a second biasing member 262 which are respectively joined with the first door 231 and the second door 232. Generally, the first biasing member 261 urges the first door toward the first closed position. The first biasing member 261 can move the first door 231 from the first open position to the first closed position upon manual release of the first door 231. The first door, however, can be adapted for manual engagement by a user to be manually urged toward the first open position. The second door can be adapted for manual engagement by user to be manually urged toward the second open position. Again, the respective first and second biasing members move these respective first and second doors from their first and second open positions to their first and second closed positions upon manual release of the respective first and second doors. Optionally, in some applications, only the first door or only the second door can be manually moved to the open position and then released in which case the perspective biasing members can urge the respective doors to the respective closed positions.

With reference to FIGS. 13-16, the biasing numbers 261 and 262 will be further described. The biasing members 261 and 262 can be identical to one another and symmetrically disposed relative to the respective doors. The first biasing member 261 can urge the door 231 in direction P1, toward a first closed position. The second biasing member 262 can urge the door 232 in direction P2, toward a second closed position. Each of the respective biasing members 261 and 262 can be joined with the frame assembly 204, the shelving system, and/or a portion of the guide assembly 220.

Figure 15:
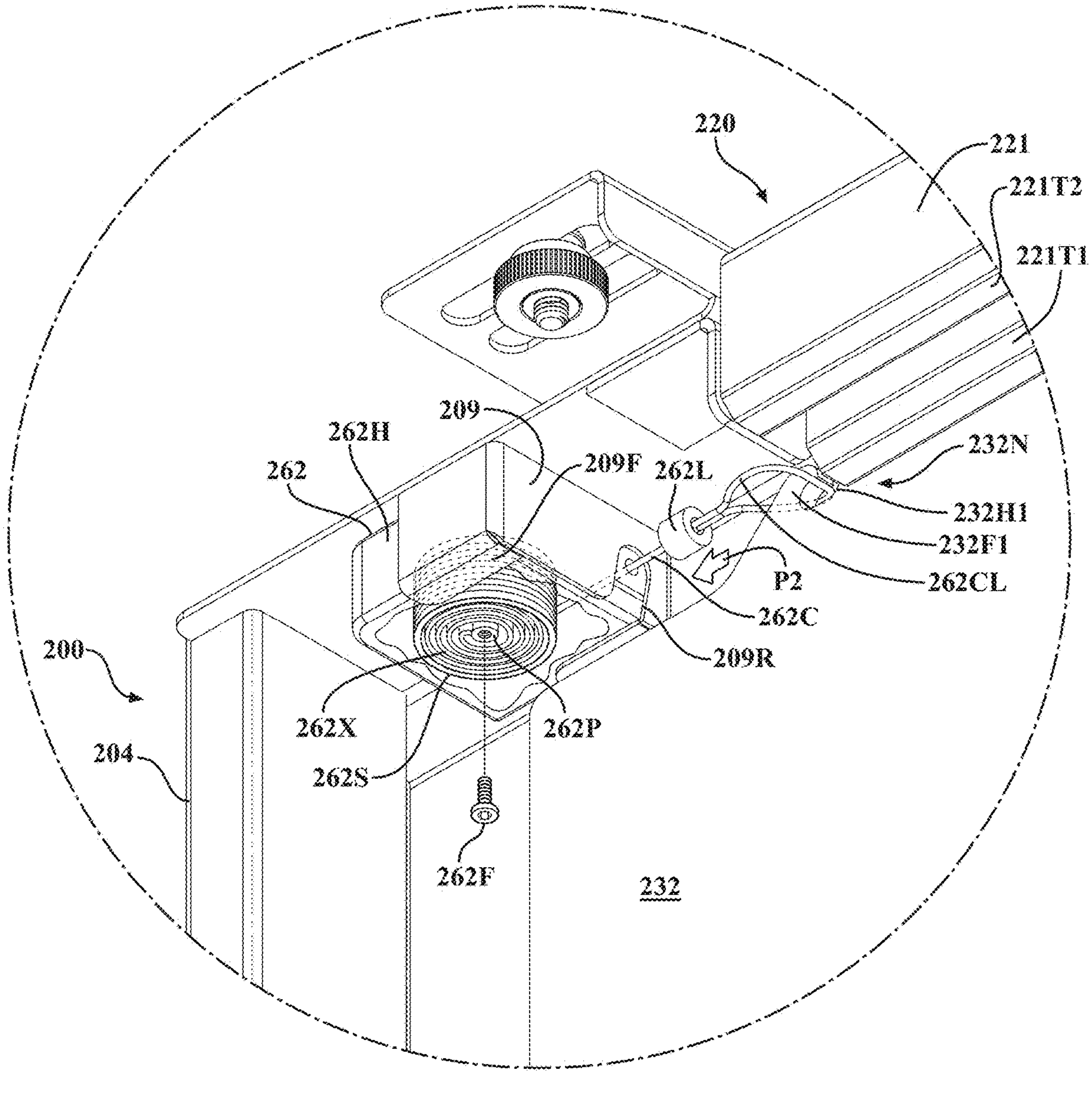
FIG. 15 is a close-up view of the region XV in FIG. 13 of the self-closing door assembly.

With further reference to FIG. 15, the second biasing member 262 and its interaction with the second door 232 and/or guide assembly 220 will be described. It is noted that the first biasing member 231 can be identical but simply reversed and can interact with the first door 231 in a similar manner. As shown in FIG. 15, the second biasing member 262 can include a housing 262H from which a cord 262 extends. As used herein, a cord can be a cord, a braided element, a strap, a rope, a cable, a string or any other elongated flexible element. The housing 262H can be configured to be received or nested in a support bracket 209 that can be secured to the frame 204 and/or the guide assembly 220. This bracket can include lower support flanges 209F upon which the housing 262H can rest under the force of gravity. In some cases, the housing can be fastened with one or more fasteners 262F directly to the frame assembly 204 or the guide assembly 220. The bracket can include a recess or aperture 209R through which the cord 262C can extend generally toward a connector 232N of the door 232. The connector 232N of door 232 can optionally include the upright flange or tab 232F1. The tab 232F1 or other part of the door can define a hole or aperture 232H1. The hole 232H1 can extend through the door and can be configured to receive a loop 262CL of the cord 262C. The hole can be continuous or continuous with a guide slot 232G such that the loop 262CL can be disposed above or adjacent to the tab 262T and slide down in direction S2 into the hole 232H1 so that the tab 262T is captured by and/or within the loop 262CL, as shown further, for example, in FIGS. 15 and 16. The cable can be joined with the door 232 and can exert a biasing force P2 on the door 232 urging it in the direction of the force P2. As a result, the door can generally move toward the closed position, being urged by biasing member 262 retracting the cord into the housing thereof. The connector 232N can include the noted tabs, hole and loop, but also can take on other forms in other applications. For example, the connector can be in the form of a simple fastener, tab or post attached to the door with a loop around the same. The end of the cord alternatively can be held by a clamp or washer to the door, thereby forming a connector. Other constructions are contemplated for the connector. And of course, the connector 231N for the other biasing member 261 can be similar or identical to the connector 232N.

Optionally, the first guide rail 221 can include a first end 221E1 and a second opposing end 222E2. The first housing supporting the first biasing member 261 can be joined with the guide rail assembly laterally outward from the first end 221E1. The second housing supporting the second biasing member 262 can be joined with the guide rail assembly laterally outward from the second end 221E2. The first cord 261C can extend from the first housing through the first end to the first connector 231N, and the second cord 262C can extend from the second housing through the second end to the second connector 232N.

The cord 262C extending from the biasing member 262 can be looped back on itself as mentioned above thereby forming a loop 262CL. A clamp 262L can secure the cord and the loop configuration thereby clamping two sections of the cord. Optionally, the loop can be replaced with a fixed eyelet that is secured to the end of the cord, or an adhesive and/or some other construction that can secure the cord to a portion of the door. Moreover, the cord might not be attached directly to the door itself but instead can be joined with a component that is secured to the door or protruding from the door. The cord 262C can extend into the housing 262H and can be wound upon a spool 262S. This spool 262S can be a cylindrical spool rotatably disposed in the housing 262H. The spool 262S can be secured to a coiled spring 262X which in itself can be coupled to a post 262P centrally disposed in the housing. The coil spring can be wound about the post and the spool 262S is associated with the spring such that the spool is urged to rotate in a particular direction, for example, in a clockwise direction shown in FIG. 15 under the force of the spring such that the cord 262C is retracted into the housing and winds along a path about the spool 262S. The spring 262X can provide the forces to effectively urge the door 232 to be pulled under the force P2 to the closed position.

The cord 262C can extend from the biasing element 262 and the housing 262H thereof generally extending parallel to the respective track of the first guide rail 221. When the door is in the open position, the cord 262C can extend into the respective track 221T2 and can be parallel to that track. Likewise, when the door is in the open position, the cord of the first biasing member 261 can extend into the guide rail 221 and its respective track 221T1. Each of the cords of the respective biasing members can be generally parallel to one another and offset from one another. For example, the first cord of the first biasing member in the second cord of the second biasing member can be parallel with one another and offset from one another when the first door is in the open position. The same can be true when the second door is in the open position and the doors more substantially overlap one another.

The biasing members each can be in the form of a retractable tether. One suitable retractable tether is a Flex-Guard RBC Standard Retractor available from Philadelphia Security Products of Essington, Pennsylvania. Of course, other retractable tethers from other manufacturers are suitable for the current embodiment as well. Moreover, as used herein, the biasing member can be a spring loaded coiled-strip type constant-force spring described in the embodiments above.

Figure 16:
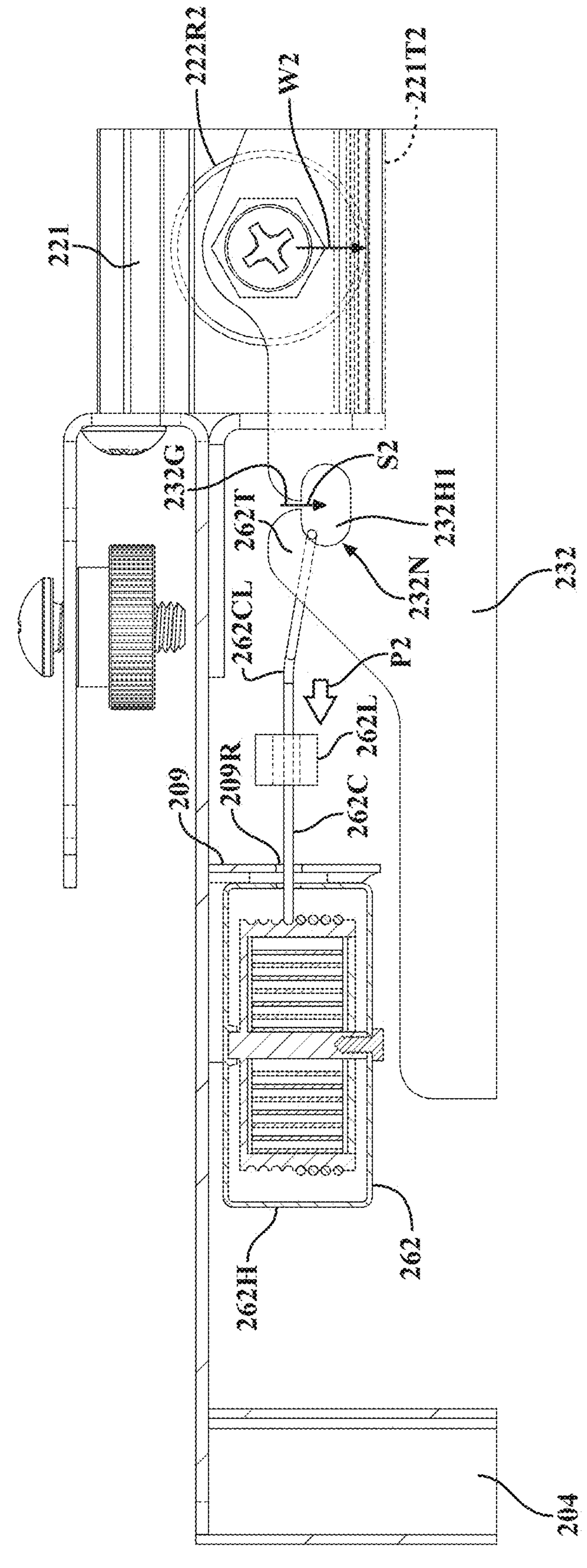
FIG. 16 is a close up front view of a biasing member of the door assembly with a cord extending to and joined with a first door of the assembly, urging the first door to a closed position.

As mentioned above, the biasing member can urge the door 232 via a pull force P2 as shown for example in FIG. 16. As this occurs, the door 232 is urged towards a closed position. During movement, the cord can pull on the door such that the roller 222R2 rules within the first guide rail 221. Optionally, the weight of the door W2 is born by the guide rail 221 and in particular the support flange 221T2. Most, if not all, of the weight W2 of the door 232 can be borne by the first guide rail 221 which again can be the upper guide rail. Because the rollers, for example 222R2, are in the tracks of the upper rail, dirt, dust and other debris typically will not fall under the force of gravity into that first guide rail 221. Thus, the guide rail and its tracks and supporting flanges can remain relatively clean to provide longevity and reliability of the rollers within the track. Moreover, because the biasing member 262 can be fully enclosed and disposed generally above the doors, it too can have increased longevity by not being contaminated with dirt, dust and other debris.

Figure 20A:
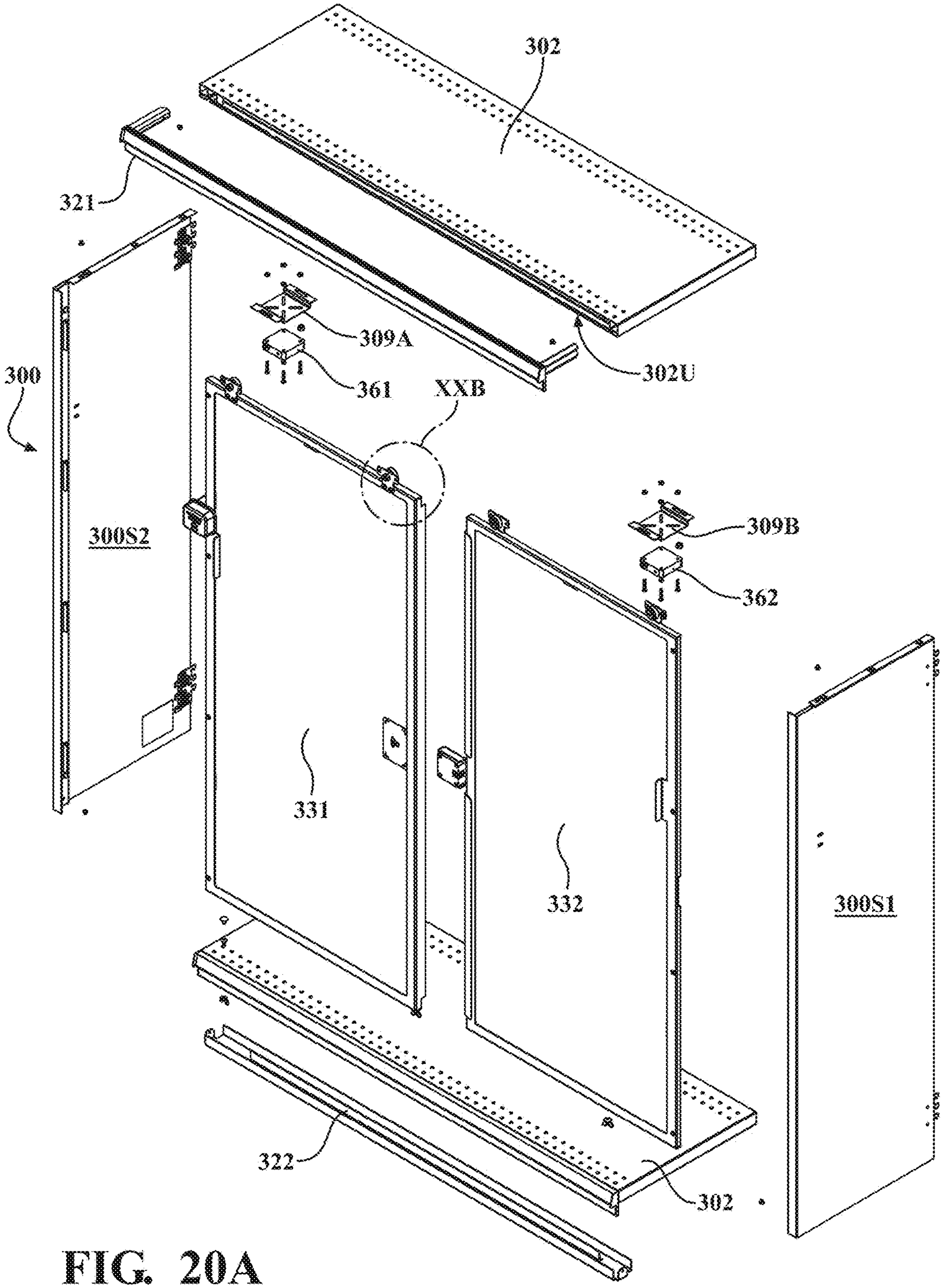
FIG. 20A is an exploded perspective view of the self-closing door assembly.
Figure 20B:
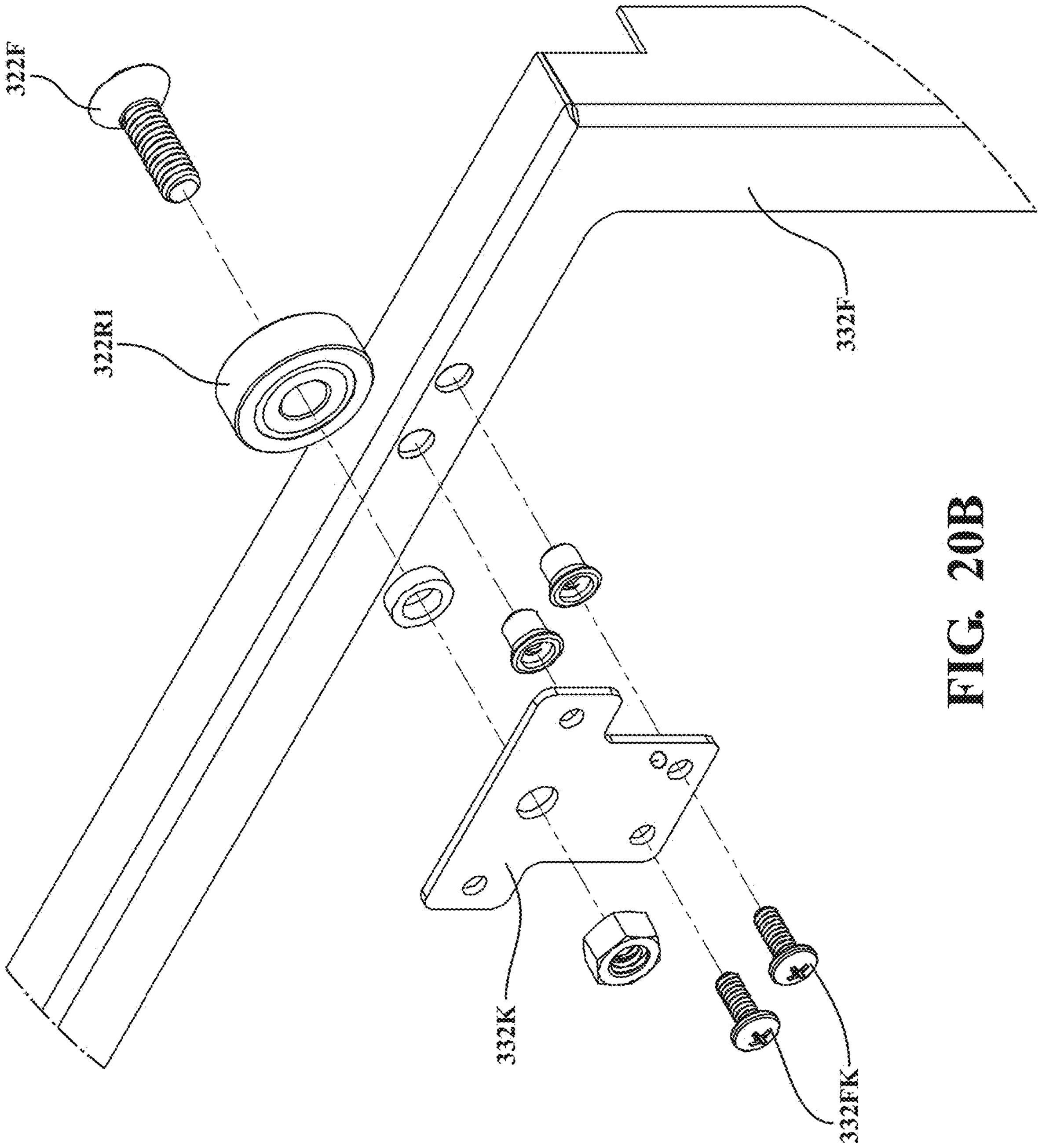
FIG. 20B is a close up view of region XXB in FIG. 20.
Figure 21:
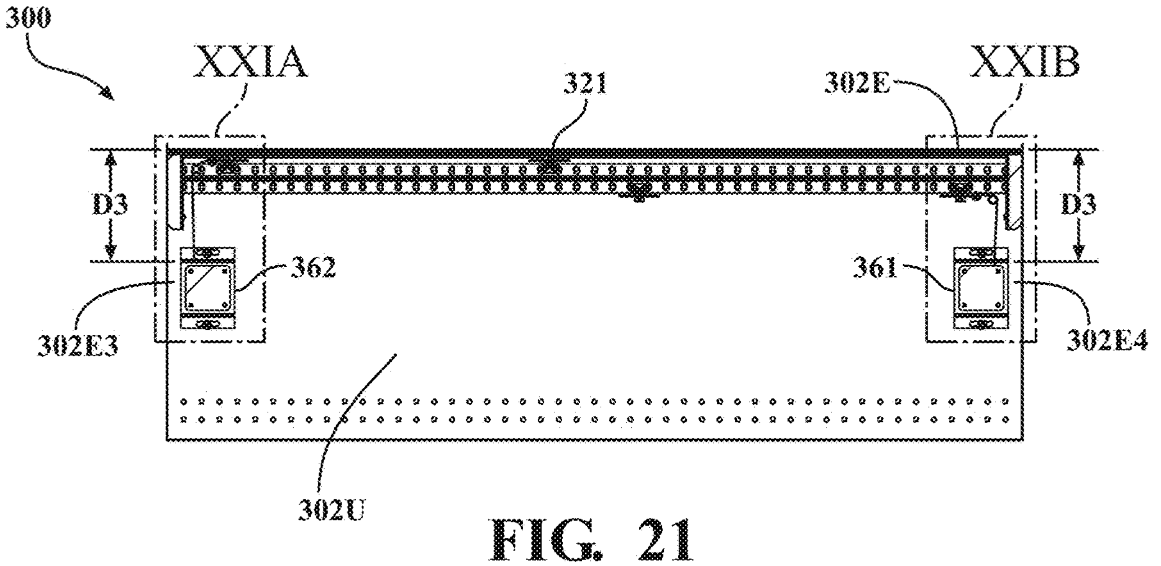
FIG. 21 is a top view of the self-closing door assembly illustrating first and second biasing members mounted to an upper shelf or panel of the door assembly.
Figure 22:
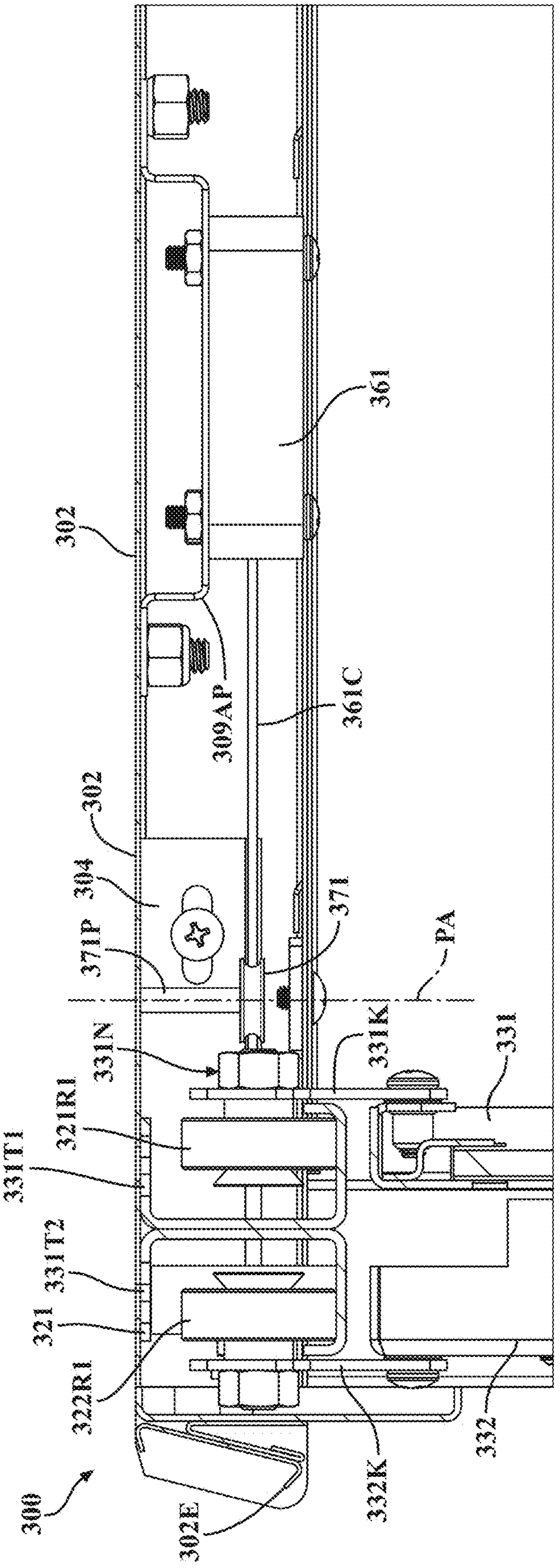
FIG. 22 is a close up side view of the first biasing member and the first cord attached to the first door and redirected via a redirection element.

A second alternative embodiment of the self-closing door assembly is shown in FIGS. 19-23 and generally is designated 300. This embodiment can be similar or identical to the embodiments above in structure, function, and operation with several exceptions. For example, this embodiment can be associated with a shelving system including a first shelf 301 and a second shelf 302 joined with a structure such as a gondola wall 303. The self-closing door assembly 300 also can include a frame assembly 304 and a guide rail assembly 300 including a first guide rail 321 and a second guide rail 322. This assembly also can include the first door 331 and a second door 332. As shown in FIG. 22, the shelving assembly 300 can include side panels 300S1 and 300S2 which can be similar to the side panels described in the embodiments above.

The first guide track 321 can be similar to the guide track mentioned above and can support the weight of the first door 331 and weight of the second door 332, suspending those doors substantially entirely against the force of gravity. However, in this construction, the guide rail 321 can include adjacent C shaped tracks 331T1 and 331T2 that face outwardly, away from one another, rather than in parallel similar orientations as with the embodiment above. The rollers shown in FIG. 22 can be disposed in these tracks. For example, the roller 322R1 can be supported in the track 331T2 and the roller 321R1 can be supported in the track 331T1. The rollers, however, can be associated with the doors with a slightly different construction. For example, the door 332 can have mounted to it a door bracket 332K. This bracket 332K can be fastened with fasteners 332FK to the door or its frame 332F. The roller 322R1 can be secured with a pin or fastener 322F to the bracket 332K. Depending on the orientation of the door relative to the guide rail, the bracket 332K can be on the outward facing or inward facing surfaces of the door. For example, as shown in FIG. 22, the bracket 332K is on the exterior facing surface of the door 332. The bracket 331K, however, is on the inward or interior facing surface of the other door 331. Depending on the application, these orientations can be altered.

Figure 23:
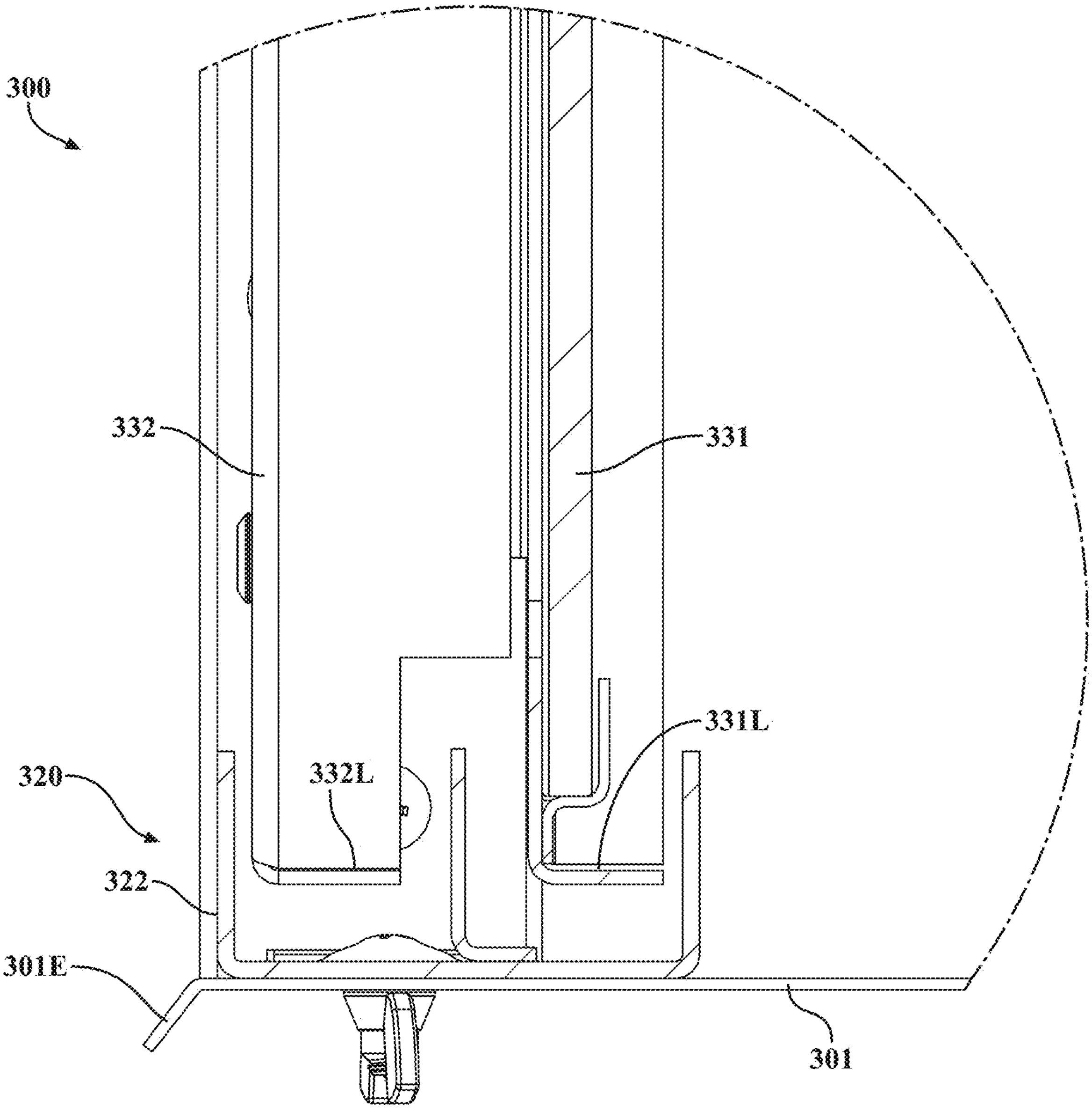
FIG. 23 is a section view of the door assembly showing a lower guide rail of the guide assembly of the self-closing door assembly, further illustrating lower portions of the first door and a second door suspended in a lower track taken from FIG. 19.

In this embodiment, with reference to FIG. 22, the first or upper guide rail 321 can be disposed adjacent and parallel to the front edge 302E of the shelf 302 when installed. That shelf 302 can extend rearward, and away from the guide rail 321. The lower rail 322 of the guide assembly 320 as shown in FIG. 23 can be disposed below the upper rail so that the upper rail and lower rail are above and below the respective doors 331 and 332. The lower most portions of the doors 331L and 332L can glide within the lower guide rail 322, without being supported by that guide rail 322 or other components therein. Due to the first and second doors being suspended vertically by substantially only the upper guide rail 321, the lower guide rail 322 optionally does not offer any support of the weight or mass of those doors 331 and 332. Thus, the lowermost portions of those doors do not rest on or engage substantially any portion of that lower guide rail 322. That lower guide rail 322 also can be disposed adjacent and parallel to the front edge 301E of the lower shelf 301.

In this embodiment of the shelving system 300, the biasing members 361 and 362 can be mounted to the shelf 302, rather than the frame assembly 304 or the guide rail assembly. For example, as shown in FIGS. 20, 21 and 22, the first biasing member 361 and second biasing member 362 can be mounted via brackets 309A and 309B to the under or lowermost lower surface 302U of the shelf 302. The brackets 309A and 309B can be secured with fasteners 309F to the shelf and can extend through holes defined by the shelf 302. The brackets 309A and 309B optionally can sandwich the biasing elements between the lower plate 309AP and 309BP of the respective brackets and the lower surface 302U of the shelf. The brackets can be outfitted with recesses or holes to accommodate the respective cords extending from the biasing members. The first and second biasing elements can be generally secured to the lower surface of the shelf and can project downward toward the first shelf via the brackets being attached to the second shelf 302. Optionally, the first and second housings of the first and second biasing members also can be fastened or secured directly to the second shelf and its lower surface depending on the application.

The first biasing member 361 can be disposed at one end of the shelf, while the other second biasing member 362 can be disposed at the second or other end of the shelf distal from the first end. In this manner, the first and second biasing elements can be disposed distal from one another and rearward from the first guide rail 321. Generally, these biasing elements 361 and 362 can be located below the second shelf 302 and above the first shelf 301.

Figure 21A:
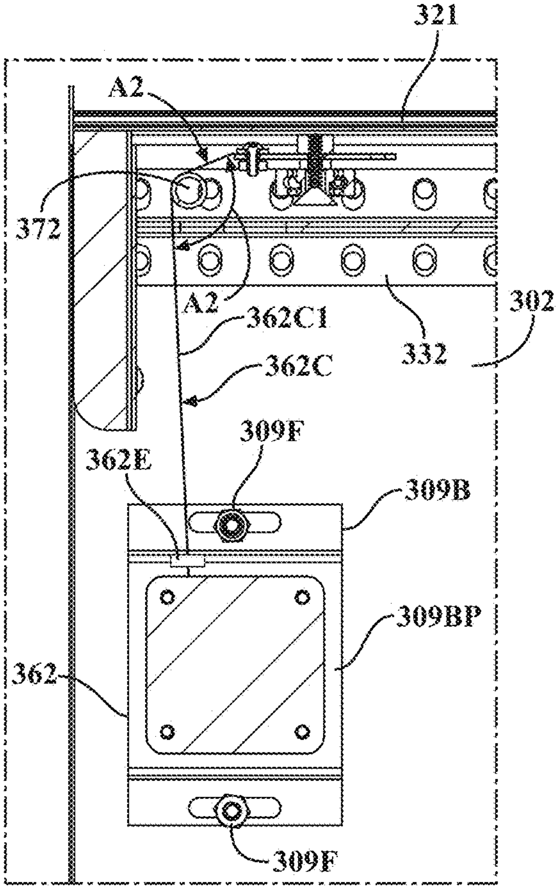
FIG. 21A is a close-up top view of the self-closing door assembly further illustrating the second biasing member and its securement to the second door via a second cord.
Figure 21B:
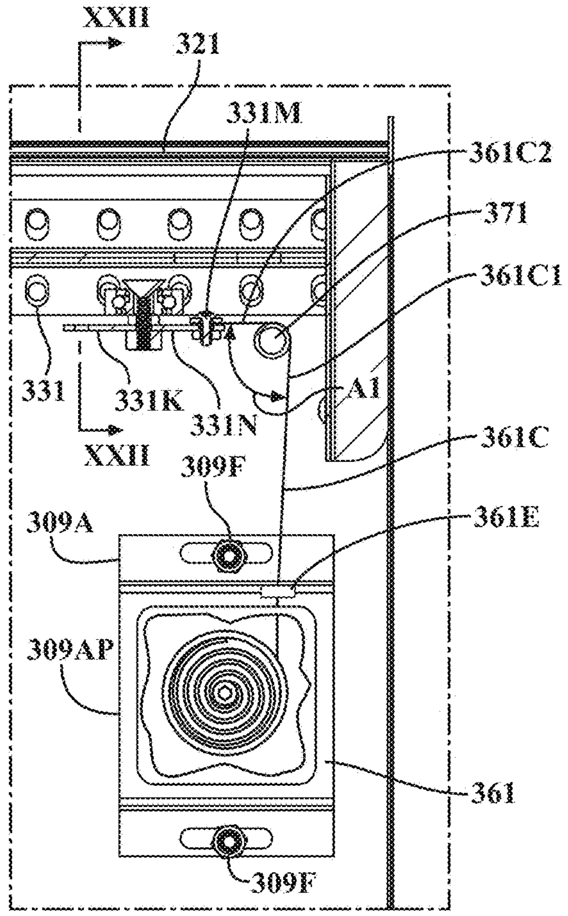
FIG. 21B is a close-up top view of the self-closing door assembly further illustrating the first biasing member and its securement to a first door via a first cord.

As shown in FIGS. 21-22, the first and second brackets can be located a distance D3 rearward from the forward edge 302E of the shelf 302. In this position, the cord exit holes 361E and 362E of the respective biasing members 361 and 362 generally face forward, toward the first guide rail 321. This contrasts the orientation of those cord exit holes in the embodiment above, where those holes are generally aligned with and parallel to the guide rail 321. With the biasing members disposed in these locations, rearward of the upper guide rail 321, the respective cords 361C and 362C are redirected to be able to connect to the doors 331 and 332. For example, as shown in FIG. 21A, the cord 361C is engaged with a first redirection element 371 that is located between the first biasing member 361 and a first connector 331N associated with the first door 331. This first connector can include a screw or clamp 331M that is joined with the bracket 331K secured to the door 331. In some cases, the cord can include a loop as described in the embodiment above that simply is secured to a fastener or the clamp 331M to secure the end of the cord to the bracket and thus the door.

As further shown in FIG. 21A, a first cord portion 361C1 of the cord 361C extends at an angle or generally transverse to the first door 331 as well as the first guide rail 321. The cord engages the redirection element 371 and a second cord portion 361C2 extends from the redirection element 371 to the connector 331N. This second cord portion 361C2 optionally can be less transverse or more parallel or generally parallel to the first door 331. As further shown in FIG. 21A, the first cord portion 361C1 can be at a first angle Al relative to the second cord portion 361C2. This angle A1 can be optionally 60° to 120°, inclusive, 80° to 120°, inclusive, 80° to 100°, inclusive, 80° to 90°, inclusive, about 90°, or other angles depending on the application and orientation of the first biasing member 361 and the cord relative to the door 331. The portions of the cord beyond the redirection element 372 associated with the cord 362C of the second biasing element 362 likewise can be at an second angle A2. The second angle A2 can be similar to the first angle Al described above. The portions of the cord 362C likewise can be in similar configurations but reversed relative to the cord 361C.

Optionally, the first cord portion 361C1 of the first cord 361C can extend transversely to the first door 331 between the first redirection element 371 and the first biasing element 361. The second portion 361C2 of the cord 361C can extend generally parallel to the door 331 on its path between the door 331 and the first redirection element 371. Similarly, a first portion 362C1 of the second cord 362C can extend transverse to the second door 332 between the second redirection element 372 and the second biasing member 362.

The redirection element 371 optionally can be in the form of a pulley that is secured to the shelf 302. As shown in FIG. 22, the redirection element 371 be secured to the shelf 302 with a post 371P. This post can be a shaft, a pin, a fastener or other element. Alternatively, the post 371P can be secured to another portion of the frame assembly 304 or to the guide rail 321 in other applications. The pulley 371 can be fully rotatable about the axis PA. In other applications, the redirection element 371 can be a simple fixed post or pin with a groove in it to guide the cord 361C to the connector 331N that can be associated with the bracket 331K or to the door directly. In some cases, the connector 331N can simply be a hole through the bracket 331K with the end of the cord 361C fastened, screwed, clamped or otherwise joined with the bracket 331K.

As shown in FIG. 21A, the first cord portion 361C1 of the cord 361C can travel along a first path from the first biasing element 361 to the first redirection element 371. After the cord is engaged by the redirection element 371, the second cord portion 361C2 travels along a second path which can generally be parallel to the path of the door 331 when transitioning from the closed position to the open position or vice versa. Optionally, the path of each of the cord portions 361C1 and 361C2 can be transverse to one another and the path of the first cord portion 361C can be transverse to the direction of movement of the first door transitioning from the first closed position to the first open position of that door or vice versa. The same can be true for the path of the cord portion 362C1 when the second door 332 transitions from the first closed position to the first open position and vice versa. The first cord portions 361C1 and 362C1 of the respective biasing members can be generally parallel to one another but transverse to the doors and the first guide rail 321. The first cord portion 361C1 also can extend a lesser distance to the first redirection element 371 than the cord portion 362C1 extends to the second redirection element 372. This variance however can be modified by movement of the brackets holding the biasing members to the second shelf and the general orientation of the biasing members relative to the guide rail and doors.

Figure 19:
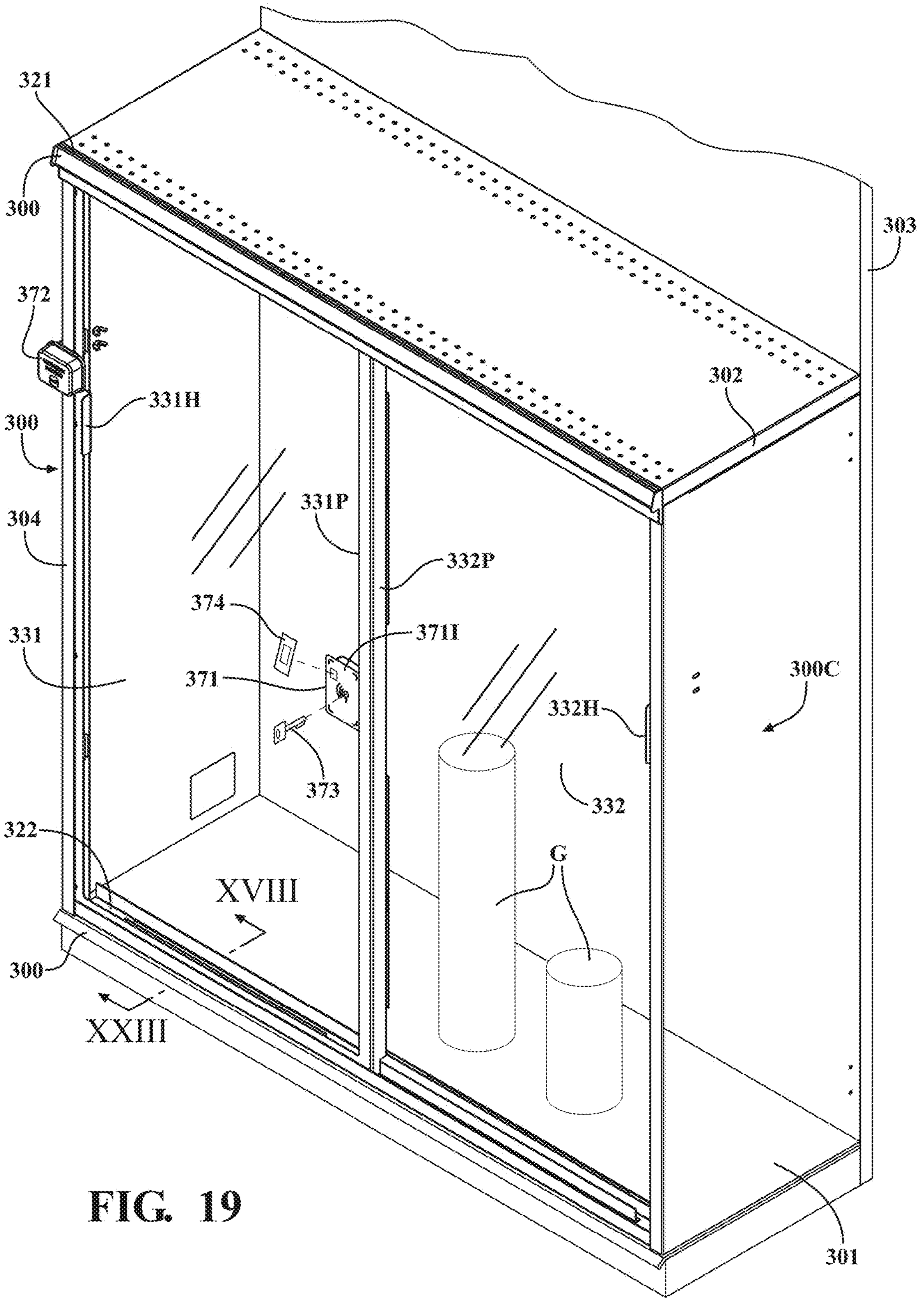
FIG. 19 is a front perspective view of a self-closing door assembly of a second alternative embodiment.

Optionally, as shown in FIG. 21, when the first biasing member 361 and second biasing member 362 are displaced rearwardly from the first guide rail 321, this can provide additional space for the guide rail 321 to extend to the ends 302E3 and 302E4 of the shelf 302. In turn, this optionally can provide further travel for the respective doors 331 and 332 across the face of the self-closing door assembly 300. This also can allow the respective handles 332H and 331H of the doors to set farther laterally to the sides of the case 300C as shown in FIG. 19. Although not shown, the doors 331 and 332 can be height adjustable as with the embodiments of the doors mentioned in the other self-closing door assemblies above. Further, although not shown, the side panels of the assembly 300 also can be depth adjustable to accommodate different depth shelves 301 and 302 of the shelving system.

Further optionally, as shown in FIG. 19, the self-closing door assembly 300 can be constructed to include a lock 371 and/or a call button 372. The call button 372 can be utilized by a consumer to call store personnel to unlock and open the assembly by opening one or both of the doors 331 and/or 332 to their open position. In this manner, the goods G can be generally protected from theft. The call button 372 can be wireless or hardwired to a communication system or an audible or visual indicator, such as a speaker or light that can indicate that a consumer has engaged the call button and needs assistance. The call button 372 can include a two way communication system to allow the consumer to talk with store personnel regarding opening of the doors and/or the goods inside.

Optionally, the lock 371 can mechanically engage one or both the door frame pieces 331P and 332P via a latch or other mechanism. The lock 371 can be a simple key lock that has a set of tumblers specific to the key 373 that can rotate a latch to disengage at least one of the frame pieces 331P and/or 332P to allow one or both the doors 331 and 332 to move to the open position thereof. The lock can be set up with a visual indicia 371I, which can be a label instructing a consumer who may desire the goods G inside the security case to retrieve a physical key 373 held by store personnel. The user can go retrieve the key and use it to unlock the lock 371 thereby opening at least one of the doors to their open position as described above.

Further optionally, the lock 371 can be in the form of an electronic lock including a key card swipe recess or a tap area such that a key card 374 can be used to actuate the lock 371 and unlock the doors for movement to their open position. The key card or similar unit can be a magnetic stripe card, a proximity or RFID card, a smart card, a blue tooth low energy card, a biometric card, a dual technology card, or other type of key card. Some suitable exemplary types of key cards or similar keys are the Versa Key and Versa X associated with a Manage Access software platform all commercially available from Mobile Tech Inc. (MTI) of Hillsboro, Oregon. The key card can allow consumers to have self-service access to the case and the goods G therein. It also can provide employee-controlled security for the access to the case because employees of the store can monitor and control consumers that have access to the case in their retail environment.

Further optionally, the lock 371 can be an electronic lock that can recognize and process signals, indicia and/or images from or displayed on an electronic device such as a smartphone. The lock optionally can include a barcode reader, an image sensor, a signal receiver or other communication element that can communicate passively or actively with the electronic device. In some cases, the consumer can receive a code, indicia, barcode or other element detectable by the lock 371. The consumer can receive this element from store personnel or via and online website or a downloaded software application. The consumer can place their electronic device near the lock 371. The lock 371 can recognize that the consumer has been authorized to gain access to the security case 300C that includes the self-closing door assembly 300. The lock can thereby automatically unlock and/or allow a user to mechanically actuate the lock to unlock the doors relative to one another or to the remainder of the case and/or frame 304 and thereby gain access to the goods. The lock can record or otherwise transmit or store in memory the access by the user's electronic device to maintain a record of access to goods G in the security case 300C. Thus, the store can use those records if any goods turn up missing to identify who had access to the case and those goods, and pursue suitable remedies. As will be appreciated, the optional lock 371 and/or call button 372 can be placed and located or associated with the security case 300C in any suitable location.

Yet further optionally, the lock 371 can be configured to automatically lock when the doors 331 and 332 are returned to their closed positions, for example shown in FIG. 19. The lock 371 in this automatic lock configuration can be well suited for incorporation into the self-closing door assembly 300, which again can include one or more biasing members 361 and 362 that automatically return the doors 331 and 332 to the closed positions from their respective open positions after a user manually releases one or both of the doors from the open position, which of course can include a fully or partially open position as used herein. Thus, a consumer or store personnel can actuate the lock 371, manually move the doors 331 and/or 332 to an open position, gain access to the goods G on the shelf in the case 300C, remove the goods, then release the one or more doors 331 and/or 332. The biasing members 361 and 362 can urge the one or more doors from the prior open position to the closed position shown in FIG. 19. The lock 371 can automatically reactivate, coupling the doors and/or otherwise locking the doors in the closed position shown there.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more elements is described herein as having a function, does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

Reference throughout this specification to "a current embodiment" or "an embodiment" or "alternative embodiment" means that a particular feature, structure, or characteristic described in connection with the embodiment is included in at least one embodiment herein. Accordingly, the appearance of the phrases "in one embodiment" or "in an embodiment" or "in an alternative embodiment" in various places throughout this specification are not necessarily all referring to the same embodiment. Additionally, the particular features, structures, or characteristics of one embodiment are contemplated for proper and full combination in any suitable manner in one or more other embodiments, which is fully contemplated herein. Further, features, structures, or characteristics of one embodiment or multiple embodiments are readily and completely mixed and matched with any features, structures, or characteristics of any other embodiment or multiple embodiments in varying combinations and permutations.

What is claimed is:

1. A self-closing door assembly for limiting access to goods in a shelving system that includes a lower shelf for displaying the goods, the lower shelf having a front edge, and a upper shelf above the lower shelf, the assembly comprising:

a frame assembly configured to be fixedly joined with the shelving system adjacent the front edge of the upper shelf;

a guide rail assembly including a first guide rail positioned in fixed relationship to the frame assembly and substantially parallel to the front edge of the upper shelf;

a first door vertically suspended along the first guide rail, the first door being moveable along the first guide rail to thereby move laterally between a first closed position that interferes with manual access to the goods disposed on the lower shelf and a first open position that enables manual access to the goods disposed on the lower shelf;

a second door vertically suspended along the first guide rail adjacent the first door, the second door being moveable along the first guide rail to thereby move laterally between a second closed position that interferes with manual access to the goods disposed on the lower shelf and a second open position that enables manual access to the goods disposed on the lower shelf, the first door and the second door being arranged in left-right opposing orientation and in an overlapping orientation when respectively in at least one of the first open position and the second open position;

a first end panel joined with the frame assembly adjacent the first door in the first closed position the first end panel extending rearward to limit access to goods on the lower shelf from a first side thereof;

a second end panel joined with the frame assembly adjacent the second door in the second closed position extending rearward to limit access to goods on the lower shelf from a second side thereof;

a first biasing member including a first cord extending from a first housing outwardly to a first connector joined with the first door such that the first biasing member urges the first door toward the first closed position; and a second biasing member including a second cord extending from a second housing outwardly to a second connector joined with the second door such that the second biasing member urges the second door toward the second closed position, the first cord and the second cord respectively urging the first door and the second door in opposing directions, wherein the first door and the second door are adapted for manual engagement to be manually urged toward at least one of the first open position and the second open position, respectively, wherein the first biasing member moves the first door from the first open position to the first closed position upon manual release of the first door, wherein the second biasing member moves the second door from the second open position to the second closed position upon manual release of the second door, wherein the first biasing member includes a first spool joined with a first coiled spring, the first cord wrapped around the first spool and retractable thereon, the first biasing member including a first post that extends vertically, the first spool horizontally oriented and rotatable about the post, wherein the frame assembly includes a tab extending in a rearward direction from the guide rail assembly beyond a first plane of the first door, the tab defining a slot, with a threaded fastener projecting through the slot, the threaded fastener joined with a nut, the threaded fastener configured to secure the frame assembly to the upper shelf, wherein the first spool is disposed below the tab.

2. The self-closing door assembly of claim 1, wherein the first door includes a first lower door portion and a first upper door portion joined with one another in a height adjustable manner to enable adjustment of a first door height according to a shelf spacing between the lower shelf and the upper shelf, wherein the second door includes a second lower door portion and a second upper door portion joined with one another in height adjustable manner to enable adjustment of a second door height.

3. The self-closing door assembly of claim 1, wherein the first biasing member is joined with at least one of the frame assembly and the upper shelf, wherein the second biasing member is joined with at least one of the frame assembly and the upper shelf distal from the first biasing member, wherein the first cord and the second cord are parallel with one another and offset from one another when the first door is in the first open position.

4. The self-closing door assembly of claim 3 comprising:

a first redirection element engaged with the first cord between the first biasing member and the first connector; and a second redirection element engaged with the second cord between the second biasing member and the second connector joined with the second door, wherein a first portion of the first cord extends transverse to the first door between the first redirection element and the first biasing member, when the first door is in the first open position, wherein a first portion of the second cord extends transverse to the second door between the second redirection element and the second biasing member.

5. The self-closing door assembly of claim 4, wherein the first housing of the first biasing member is secured to a lower surface of the upper shelf and projects downward toward the lower shelf, wherein the second housing of the second biasing member is secured to the lower surface of the upper shelf and projects downward toward the first shelflower shelf, wherein the first housing and the second housing are displaced rearward from a second front edge of the upper shelf and distal from the frame assembly.

6. The self-closing door assembly of claim 1, wherein the first door is joined with a first roller that is in rolling engagement with the first guide rail such that a first weight of the first door is born by the first guide rail as the first door is suspended along the first guide rail, wherein the second door is joined with a second roller that is in rolling engagement with the first guide rail distal from the first roller such that a second weight of the second door is born by the first guide rail as the second door is suspended along the first guide rail.

7. The self-closing door assembly of claim 6, wherein the first guide rail includes a first and a second end, wherein the first housing is joined with the guide rail assembly laterally outward from the first end, wherein the second housing is joined with the guide rail assembly laterally outward from the second end, wherein the first cord extends from the first housing through the first end to the first connector, wherein the second cord extends from the second housing through the second end to the second connector.

8. A self-closing door assembly for limiting access to goods in a shelving system that includes a lower shelf for displaying the goods and an upper shelf having a front edge, the assembly comprising:

a frame assembly configured to be joined with the shelving system adjacent the front edge of the upper shelf;

a guide rail assembly positioned in fixed relationship to the frame assembly and parallel with the front edge of the upper shelf, the guide rail assembly including a first end;

a first door suspended along the guide rail assembly and moveable between a first closed position that interferes with manual access to the goods disposed on the lower shelf and a first open position that enables manual access to goods disposed on the lower shelf; and a first biasing member disposed between the frame assembly and the first door to urge the first door in a horizontal direction toward the first closed position, the first door configured for manual engagement to be urged toward the first open position, the first biasing member arranged to return the first door to the first closed position upon manual release thereof, wherein the first biasing member includes a first spool joined with a first coiled spring within a first housing, with a first cord wrapped around the first spool and retractable thereon under force generated by the first coiled spring, wherein the first spool is mounted beyond the first end of the guide rail assembly, and beyond the first door when the first door is in the first closed position, wherein the first housing is mounted to a first bracket, wherein the first bracket defines at least one of a recess and a hole, wherein the first cord extends through the at least one of the recess and the hole toward the guide rail assembly, above the first door.

9. The self-closing door assembly of claim 8, wherein the first biasing member includes a first housing and a first cord windable in a first path on a first spool within the first housing, wherein the first door is joined with a first roller and a second roller distal from the first roller, wherein the first guide assembly includes a first guide rail having a first support flange, wherein the first roller and the second roller are disposed on the first support flange and in rolling engagement therewith.

10. The self-closing door assembly of claim 9, wherein the frame assembly includes a tab defining a slot, with a threaded fastener projecting through the slot, the threaded fastener joined with a nut, the threaded fastener configured to secure the frame assembly to the upper shelf, wherein the first spool is disposed below the tab.

11. The self-closing door assembly of claim 8, wherein the shelving system includes a upper shelf located above the lower shelf, wherein the first biasing member includes a first housing and a first cord windable in a first path on a first spool within the first housing, wherein the first housing is joined with the upper shelf above and rearward of the first door, wherein a first pulley is disposed between the first spool and the first door, wherein the first cord is engaged with the pulley such that the first cord is redirected from a first path to a second path transverse to the first path in extending from the first spool to the first door.

12. The self-closing door assembly of claim 11, wherein the guide rail assembly includes a first guide rail disposed above the first door, wherein a plurality of first rollers are disposed between the first door and the first guide rail, wherein the first cord extends along the second path along the first guide rail parallel to the first guide rail as the first door transitions to the first open mode, wherein the plurality of rollers support a first weight of the first door, wherein the first path is transverse to the second path and a direction of movement of the first door transitioning from the first closed mode to the first open mode.

13. The self-closing door assembly of claim 8, wherein the guide rail assembly includes a first guide rail disposed above the first door, wherein the first door includes a first connection bracket joined with a first roller, wherein the first roller is in rolling engagement with the first guide rail, wherein the first roller bears a first weight of the first door to vertically suspend the first door along the first guide rail.

14. The self-closing door assembly of claim 13, wherein the first cord is joined with the first bracket adjacent the first roller, wherein the first housing is secured to a upper shelf above the lower shelf.

15. The self-closing door assembly of claim 8, wherein the first biasing member includes a first cord projecting from a spring wound spool, toward the first door, wherein the first cord is secured to the first door adjacent the guide rail assembly, wherein the first cord extends along a first path and a second path that are disposed transversely at an angle relative to one another.

16. A self-closing door assembly for limiting access to goods in a shelving system that includes a lower shelf for displaying the goods and an upper shelf having a front edge, and an upper shelf above the lower shelf, the assembly comprising:

a guide rail assembly including a first guide rail configured for fixed mounting substantially parallel to the upper shelf above the lower shelf;

a first door vertically suspended along the first guide rail, the first door being moveable along the first guide rail to thereby move laterally between a first closed position that interferes with manual access to the goods disposed on the lower shelf and a first open position that enables manual access to the goods disposed on the lower shelf;

a second door vertically suspended along the first guide rail adjacent the first door, the second door being moveable along the first guide rail to thereby move laterally between a second closed position that interferes with manual access to the goods disposed on the lower shelf and a second open position that enables manual access to the goods disposed on the lower shelf, the first door and the second door being arranged in an overlapping configuration;

a first biasing member including a first cord extending from a first housing outwardly to a first connector joined with the first door such that the first biasing member urges the first door toward the first closed position; and a second biasing member including a second cord extending from a second housing outwardly to a second connector joined with the second door such that the second biasing member urges the second door toward the second closed position, the first cord and the second cord respectively urging the first door and the second door in opposing directions, wherein the first door and the second door are adapted for manual engagement to be manually urged toward at least one of the first open position and the second open position, respectively, wherein the first biasing member laterally moves the first door from the first open position to the first closed position upon manual release of the first door with the first cord retracting into the first housing, wherein the second biasing member laterally moves the second door from the second open position to the second closed position upon manual release of the second door with the second cord retracting into the second housing, wherein the first biasing member includes a first spool joined with a first coiled spring, the first cord wrapped on the first spool and retractable thereon, wherein the first spool is mounted a first distance inward and distally from the front edge of the upper shelf, rearward of the first door and first guide rail, wherein a first redirection element is disposed along the first cord between the first spool and the first door, and is disposed under the upper shelf, above the first door, wherein the first door hangs under aforce of gravity and is suspended and movably disposed in a second guide rail of the guide rail assembly below the first guide rail.

17. The self-closing door assembly of claim 16, comprising:

a tab defining a slot joined with the first guide rail; and a fastener extending through the slot to secure the first guide rail to the upper shelf.

18. The self-closing door assembly of claim 16, wherein the upper shelf includes a horizontal surface extending rearward from the first guide rail, wherein the upper shelf includes a front flange extending downward to the front edge of the upper shelf, wherein the first guide rail is disposed rearward of the front flange, wherein a fastener joins the first guide rail with the upper shelf under the horizontal surface, the fastener being disposed rearward of the front flange of the upper shelf.

19. A self-closing door assembly system comprising:

a lower shelf configured to displaying goods thereon to a consumer;

an upper shelf having a horizontal surface and a downwardly extending front flange that extends to a forward edge;

a frame assembly removably joined adjacent the front edge of the upper shelf;

a guide rail assembly positioned in fixed relationship to the frame assembly and parallel with the front edge of the upper shelf, the guide rail assembly including a first end and a first guide rail of the guide rail assembly positioned rearward of the front flange;

a first door suspended along the first guide rail and moveable between a first closed position that interferes with manual access to the goods disposed on the lower shelf and a first open position that enables manual access to goods disposed on the lower shelf; and a first biasing member disposed between the frame assembly and the first door to urge the first door in a horizontal direction toward the first closed position, the first door configured for manual engagement to be urged toward the first open position, the first biasing member arranged to return the first door to the first closed position upon manual release thereof, wherein the first biasing member includes a first spool joined with a first coiled spring within a first housing, with a first cord wrapped around the first spool and retractable thereon under force generated by the first coiled spring, wherein the first spool is mounted beyond the first end of the first guide rail, and beyond the first door when the first door is in first closed position.

20. The self-closing door assembly system of claim 19 comprising:

a tab defining a slot joined with the first guide rail and including a fastener extending through the slot and through the upper shelf to secure the first guide rail to the upper shelf such that the first guide rail is disposed under the upper shelf.

* * * * *